(12) United States Patent
Nagata et al.

(10) Patent No.: US 8,400,975 B2
(45) Date of Patent: Mar. 19, 2013

(54) USER APPARATUS AND CELL SEARCH METHOD

(75) Inventors: Satoshi Nagata, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 92 days.

(21) Appl. No.: 12/681,062

(22) PCT Filed: Sep. 26, 2008

(86) PCT No.: PCT/JP2008/067495
§ 371 (c)(1),
(2), (4) Date: Jun. 25, 2010

(87) PCT Pub. No.: WO2009/044680
PCT Pub. Date: Apr. 9, 2009

(65) Prior Publication Data
US 2010/0265882 A1      Oct. 21, 2010

(30) Foreign Application Priority Data

Oct. 1, 2007   (JP) ................. 2007-258105

(51) Int. Cl.
*H04W 4/00*     (2009.01)
(52) U.S. Cl. ......... 370/329; 370/338; 370/342; 370/345
(58) Field of Classification Search .................. 370/328, 370/342, 345, 350; 375/150, 350; 455/522
See application file for complete search history.

(56) References Cited

U.S. PATENT DOCUMENTS

| | | | |
|---|---|---|---|
| 6,480,558 B1 * | 11/2002 | Ottosson et al. | 375/350 |
| 7,630,730 B2 * | 12/2009 | Becker et al. | 455/522 |
| 2003/0012270 A1 * | 1/2003 | Zhou et al. | 375/150 |
| 2004/0085946 A1 * | 5/2004 | Morita et al. | 370/342 |
| 2007/0177535 A1 * | 8/2007 | Zalio | 370/328 |

FOREIGN PATENT DOCUMENTS

| | | |
|---|---|---|
| EP | 1187369 A2 | 3/2002 |
| EP | 1598948 A1 | 11/2005 |
| JP | 2000-138657 A | 5/2000 |
| JP | 2003-133997 A | 5/2003 |
| JP | 2004-242139 A | 8/2004 |

OTHER PUBLICATIONS

International Search Report w/translation from PCT/JP2008/067495 dated Jan. 6, 2009 (4 pages).
Written Opinion from PCT/JP2008/067495 dated Jan. 6, 2009 (3 pages).

(Continued)

*Primary Examiner* — Hassan Kizou
*Assistant Examiner* — Toan Nguyen
(74) *Attorney, Agent, or Firm* — Osha Liang LLP

(57) ABSTRACT

A user apparatus to be used in a mobile communications system including multiple cells is disclosed. The user apparatus includes a unit which receives a sync channel; a unit which extracts a primary sync channel and a secondary sync channel from the sync channel and conducts a cell search; and a unit which controls, based on a condition for setting an averaging time in a time direction in the cell search, a correlation detection time in a correlation detection performed in the unit which conducts the cell search.

12 Claims, 15 Drawing Sheets

OTHER PUBLICATIONS

Nagata et al.; "Evolved UTRA Musen Interface o Mochiiru Shoki Oyobi Shuhen Cell Search Tokusei" (translated as Investigation on Initial and Neighboring Cell Search Time Performance Using Latest Air Interface in Evolved UTRA); Sep. 2007 IEICE Communications Society Conference; p. 348 (8 pages).
Nagata, et al.; "Cell Search Time Comparison Using Hierarchical and Non-Hierarchical Synchronization Channels in OFDM Based Evolved Utra Downlink"; Vehicular Technology Confeence, Apr. 2007; pp. 1239-1244 (6 pages).
3GPP TSG RAN WG1 Meeting #50, R1-073683; Investigation on P-SCH Specific Scrambling Sequences for S-SCH; Athens, Greece; Aug. 20-24, 2007 (4 pages).
3GPP TR 25.814 v7.00; "Physical layer aspects for evolved Universal Terrestrial Radio Access (UTRA)"; Jun. 2006 (126 pages).
3GPP TSG-RAN WG1 #46bis, R1-062990; "Outcome of cell search drafting session"; Seoul, Korea; Oct. 9-13, 2006 (2 pages).
3GPP TSG RAN WG1 46bis, R1-062636; "Cell Search Performance in Tightly Synchronized Network for E-UTRA"; Seoul, Korea; Oct. 9-13, 2006 (8 pages).
3GPP TSG-RAN WG1 #47bis; R1-070428; "Further analysis of initial cell search for Approach 1 and 2—single cell scenario"; Sorrento, Italy; Jan. 15-19, 2007 (10 pages).
3GPP TS 36.211 v1.0.0; "Physical Channels and Modulation"; Mar. 2007 (30 pages).
3GPP TSG-RAN WG1 LTE Ad Hoc Meeting, R1-060042; "SCH Structure and Cell Search Method in E-UTRA Downlink"; Helsinki, Finland; Jan. 23-25, 2006 (9 pages).
3GPP TSG-RAN WG1 #48bis, R1-071584; "Secondary Synchronization Signal Design"; Malta; Mar. 26-30, 2007 (7 pages).
3GPP TSG RAN1 #48bis, R1-071794; "Way forward for stage 2.5 details of SCH"; St. Julian's, Malta; Mar. 26-30, 2007 (1 page).
Naata et al.; "Investigation of Synchronization Channel Sequences in OFDM Based Evolved UTRA Downlink"; RCS; Jul. 2007 (with translation) (10 pages).
Chu; "Polyphase Codes With Periodic Correlation Properties"; IEE Trans. Inform. Theory; vol. 38, pp. 531-532; Jul. 1972 (2 pages).
Frank et al.; "Phase shift pulse codes with good periodic correlation properties"; IRE Trans. on Info. Theory; vol. IT-8, pp. 381-382; Oct. 1962 (4 pages).
Golay; "Complementary Seies"; IRE Trans. Inform. Theory; vol. 7, pp. 82-87; Apr. 1962 (3 pages).
3GPP TSG RAN WG1 #46bis, R1-062487; "Hierarchical SCH signals suitable for both (FDD and TDD) modes of E-UTRA"; Seoul, Korea; Oct. 9-13, 2006 (4 pages).
3GPP TSG RAN WG1 Meeting #47bis, R1-070146; "S-SCH Sequence Design"; Sorrento, Italy; Jan. 15-19, 2007 (5 pages).
3GPP TSG RAN WG1 #49, R1-072093; "Details on SSC sequence design"; Kobe, Japan; May 7-11, 2007 (5 pages).
3GPP TSG RAN WG1 Meeting #49, R1-072661; "Scrambling Method for Two S-SCH Short Code"; Orland, FL USA; Jun. 25-29, 2007 (4 pages).
Office Action for Japanese Patent Application No. 2007-258105 mailed Jun. 26, 2012, with English translation thereof (6 pages).
Satoshi Nagata et al., "Investigation of Synchronization Channel Sequences in OFDM Based Evolved UTRA Downlink," The Institute of Electronics, Information and Communication Engineers, IEICE Technical Report, RCS2007-49, (Jul. 2007) (7 pages).
Satoshi Nagata et al., "Cell Search Performance Comparison between Hierarchical and Non-Hierarchical Synchronization Channel in Evolved UTRA Downlink," B-5-33, Jul. 2006 (2 pages).
Tetsuro Imai et al., "Analysis of Cell Search Performance for W-CDMA Cellular System," vol. J83-B, No. 9, pp. 1245-1257, Sep. 2000 (14 pages).
Minori Morita et al., "Optimization of Pilot Channel and Performance of 4-step Cell Search Algorithm for OFDM Wireless Access in Forward Link," The Institute of Electronics, Information and Communication Engineers, CS2004-147, RCS2004-254 (Jan. 2005) (7 pages).
Patent Abstracts of Japan for Japanese Publication No. 2004-242139 published Aug. 26, 2004 (1 page).
Chinese Office Action for Application No. 20088011823.7, mailed on Aug. 23, 2012 (14 pages).
European Office Action for Application No. 08836264.5, mailed on Jan. 2, 2013 (8 pages).
NTT DoCoMo, et al., "Three-Step Cell Search Method for E-UTRA", 3GPP TSG RAN WG1 Meeting #46, R1-062095, Tallinn, Estonia, Aug. 28-Sep. 1, 2006 (4 pages).
Chi-Fang Li, et al., "ASIC Design for Cell Search in 3GPP W-CDMA", IEEE 54th Vehicular Technology Conference Oct. 7-11, 2001, Atlantic City, NJ (pp. 1383-1387).

* cited by examiner

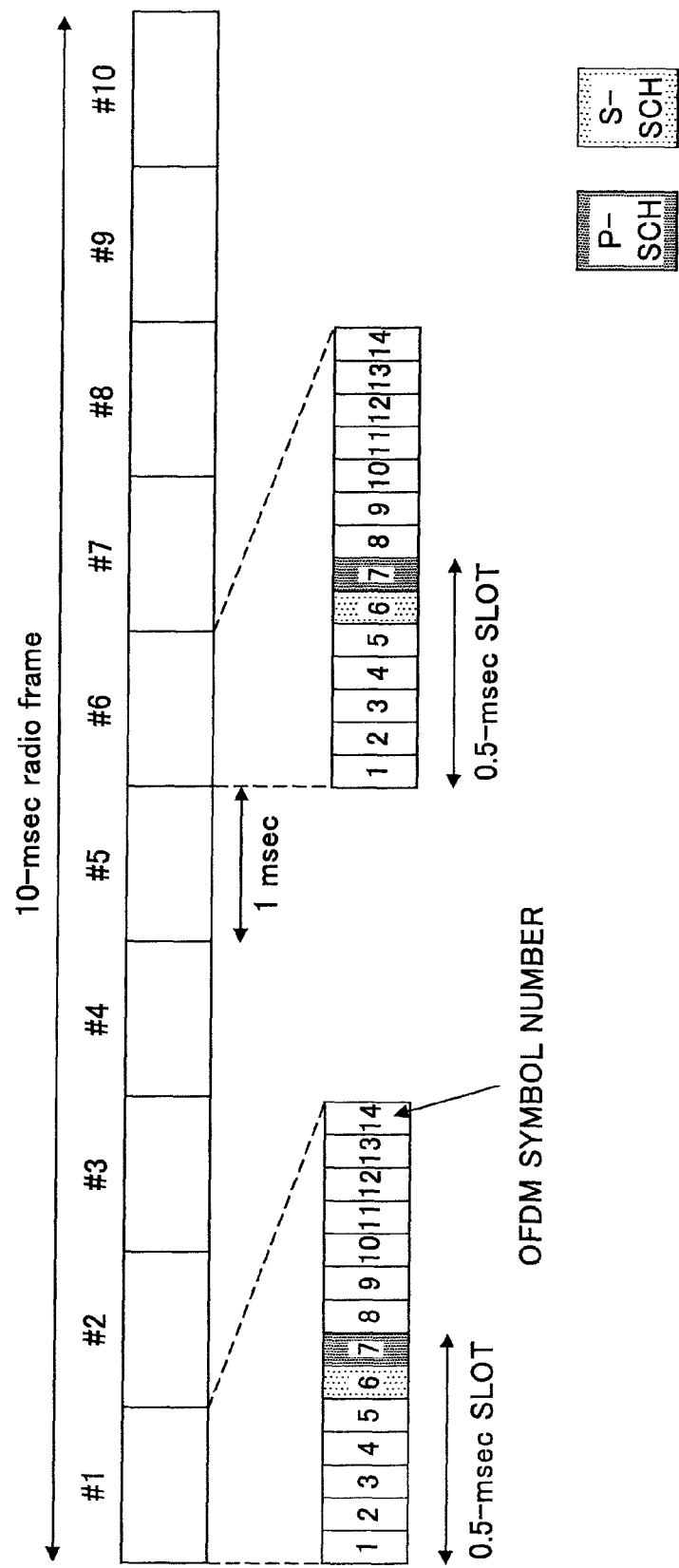

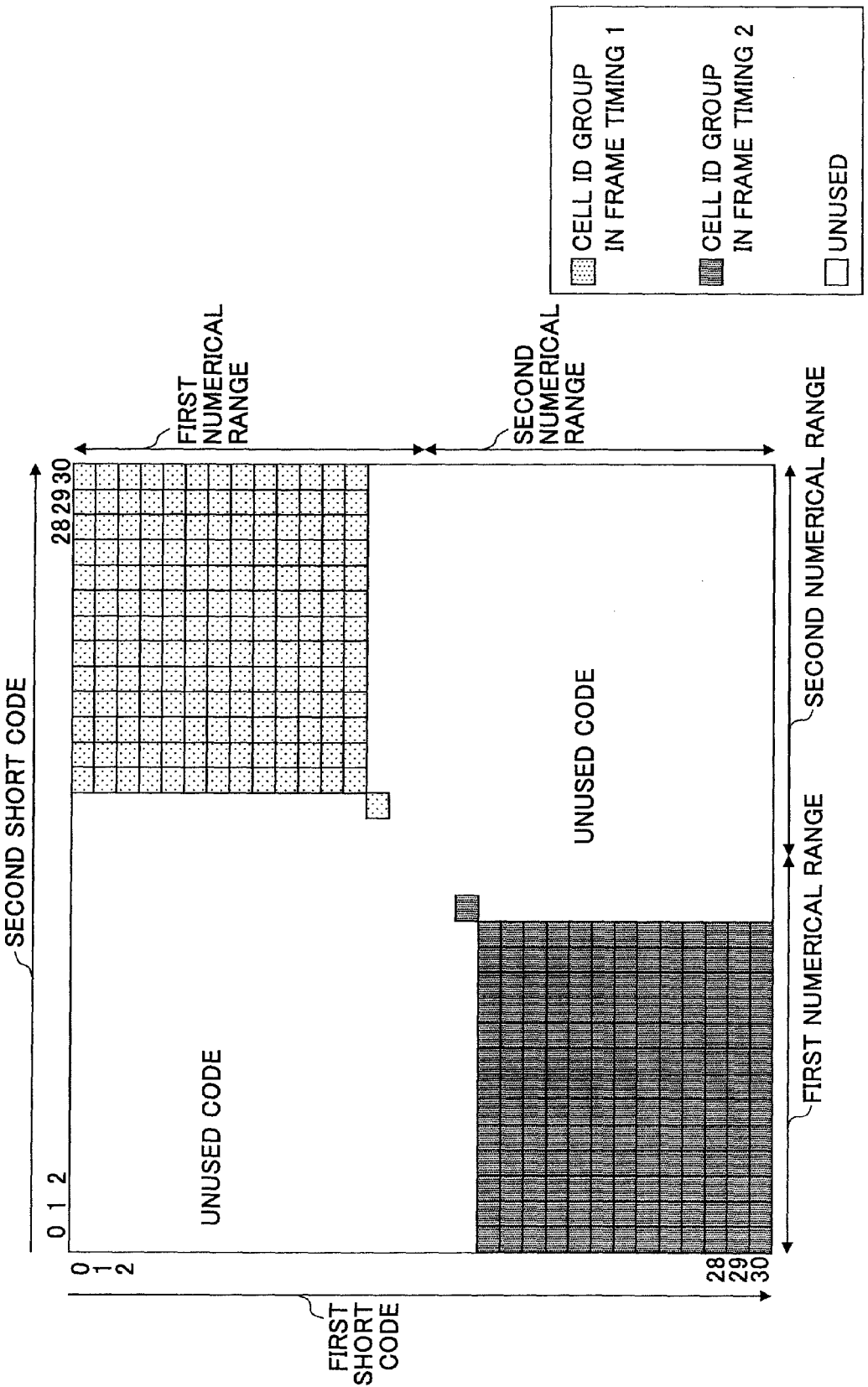

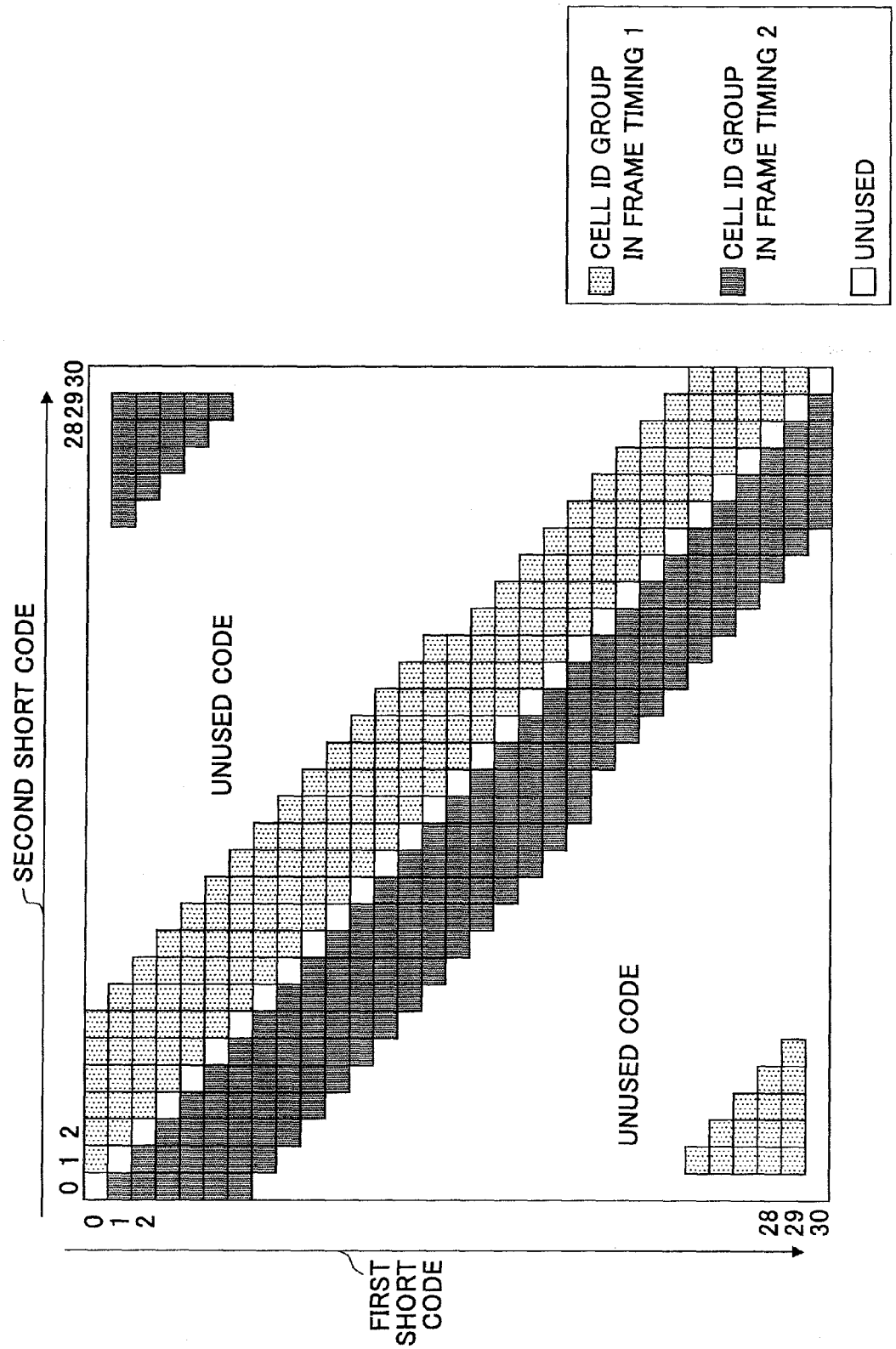

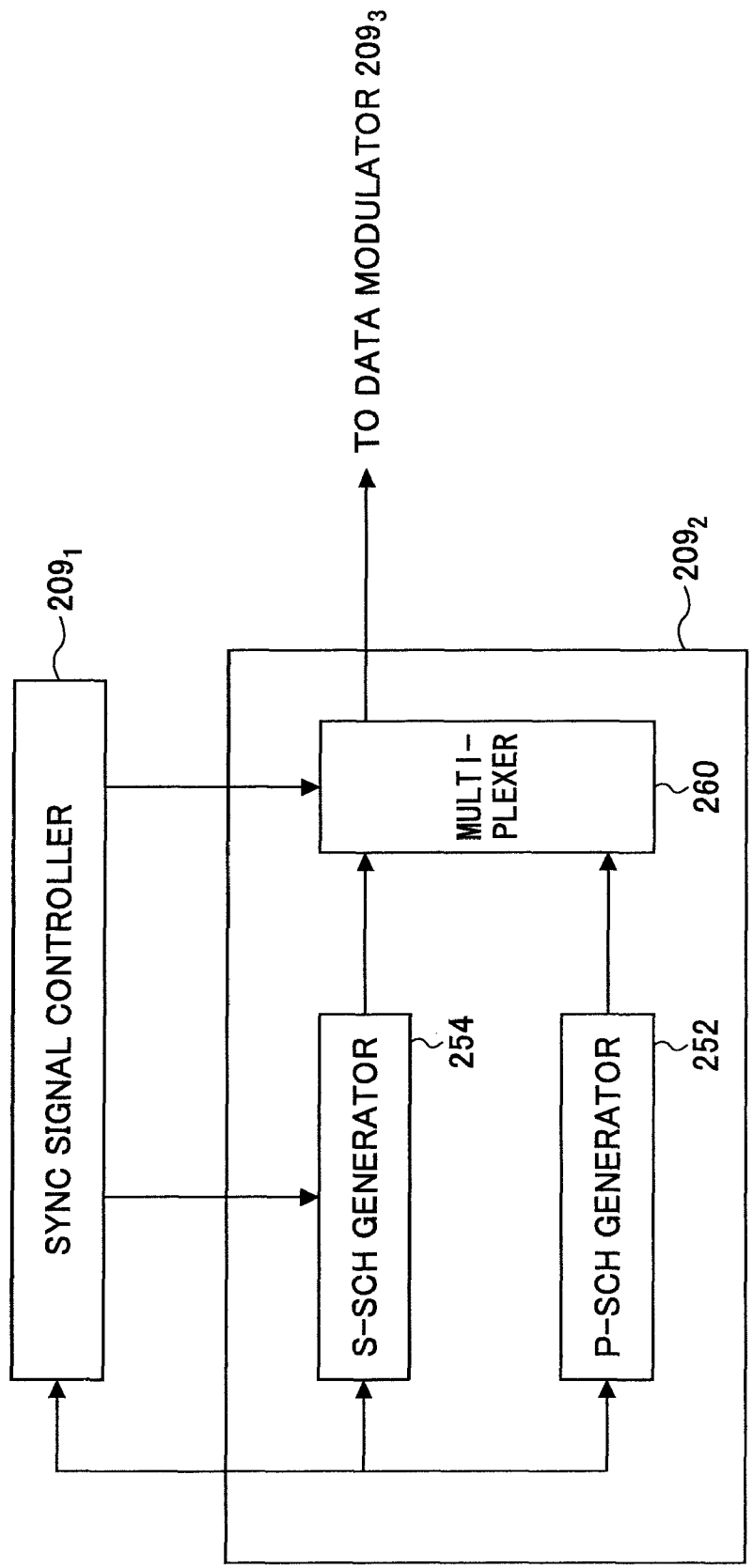

USER APPARATUS AND CELL SEARCH METHOD

BACKGROUND OF THE INVENTION

1. Field of the Invention

The present invention generally relates to radio communications systems to which Orthogonal Frequency Division Multiplexing (OFDM) is applied in downlink and specifically relates to user apparatuses and cell search methods.

2. Description of the Related Art

As a communications scheme to succeed W-CDMA (Wideband Code Division Multiple Access) and HSDPA, Long Term Evolution (LTE) is being studied in a W-CDMA standardization body called 3GPP. Moreover, as radio access schemes, OFDM is being considered for downlink, while SC-FDMA (Single-Carrier Frequency Division Multiple Access) is being considered for uplink (see 3GPP TR 25.814 (V7.0.0), "Physical Layer Aspects for Evolved UTRA", June 2006, for example).

The OFDM, which is a scheme for dividing a frequency band into multiple narrow frequency bands (sub-carriers) and overlaying data onto the respective frequency bands for transmission, densely arranges the sub-carriers on the frequency axis such that one sub-carrier partially overlaps another sub-carrier without their interfering with each other, making it possible to achieve high-speed transmission and to improve frequency utilization efficiency.

The SC-FDMA is a transmission scheme which divides a frequency bandwidth and transmits using different frequency bands among multiple terminals to make it possible to reduce interference between the terminals. The SC-FDMA, which features a reduced variation in transmission power, makes it possible to achieve wide coverage as well as low power consumption of the terminals.

In the LTE, the OFDM provides for two types of CPs for reducing the effect of inter-symbol interference by a delay wave, namely a Long CP and a Short CP, each with a different length. For example, the Long CP is applied in a cell with a large radius and at the time of transmitting an MBMS (Multimedia Broadcast Multicast Service) signal, while the Short LP is applied in a cell with a small radius. The number of OFDM symbols within one slot is 6 when applying the Long CP and 7 when applying the short CP.

Now, in a radio communications system using the W-CDMA or the LTE, etc., a mobile station must generally detect a cell with a good radio quality for the own station based on a synchronization (sync) signal, etc., at the time of turning on the power, during camping, during communications, or at the time of a DRX reception during communications. The process, which is meant to search for a cell to which a radio link is to be connected, is called a cell search. The cell search method is generally determined based on a time needed for the cell search as well as a throughput of the mobile station at the time of conducting the cell search. In other words, the above-described cell search method must be a method such that the time required for the cell search is short and the throughput of the mobile station at the time of conducting the cell search is small.

In the W-CDMA, the cell search is conducted using two types of sync signals, namely a Primary SCH (P-SCH) and a Secondary SCH (S-SCH). Similarly, conducting the cell search using the two types of the sync signals of the P-SCH and S-SCH are also being considered in the LTE.

For example, as the cell search method, a cell search method is being considered such that the P-SCH with one sequence and S-SCH with multiple sequences are transmitted at a time interval of once every 5 ms (See R1-062990, Outcome of cell search drafting session, for example.). In the above-described method, the P-SCH specifies a downlink receive timing from each cell; while the S-SCH transmitted in the same slot specifies cell-specific information sets such as receive frame timing detection and cell or cell group ID. Here, it is generally possible to use a channel estimation value determined from the above-described P-SCH in demodulating and decoding the above-described S-SCH. Then, for grouping the cell IDs, the cell IDs to be grouped are thereafter detected form those cell IDs belonging to the group ID of the detected cell. For example, the cell ID is calculated based on a signal pattern of a pilot signal. Moreover, the cell ID is calculated based on the demodulation and decoding of the P-SCH and the S-SCH, for example. Alternatively, the cell ID may be included as an information element of the S-SCH without the cell ID grouping. In this case, the mobile station can detect the cell ID at the time of demodulating and decoding the S-SCH.

However, in an inter-station sync method in which signals from each cell are being synchronized, when the above-described cell search method is applied, the S-SCHs transmitted from multiple cells in different sequences are demodulated and decoded based on the channel estimation value which is determined from the P-SCHs transmitted from multiple cells in the same sequence. Thus, there is a problem of a transmission characteristic of the S-SCH being degraded. Here, the transmission characteristics also include a time needed for the cell search, for example. For an inter-station non-sync system in which signals from each cell are not being synchronized, receive timings of the P-SCH sequences transmitted from the multiple cells differ from one cell to another of the multiple cells. Thus, such a problem as described above does not occur.

In order to prevent a degradation in the S-SCH characteristics in the inter-station sync system, a cell search method is being considered such that the number of the P-SCH sequences are increased from 1 to a number no less than 2 (for example, 3 or 7) (See R1-062636, Cell Search Performance in Tightly Synchronized Network for E-UTRA, for example.). Alternatively, a method is being proposed for transmitting the P-SCH in different transmission intervals per cell in order to prevent degradation in characteristics of the S-SCH in the inter-station sync system (See R1-070428, Further analysis of initial cell search for Approach 1 and 2-single cell scenario, for example.). In the above-described method, the P-SCHs having different timings of receiving from the multiple cells may be used in the demodulating and decoding of the S-SCH. Thus, it is made possible to prevent the S-SCH characteristic degradation as described above.

Now, from a point of view of cell design, it is deemed that the larger the number of sequences of the P-SCH and the types of transmission intervals as described above, the better. This is because, the smaller the number of sequences of the P-SCH or the types of transmission intervals, the higher a probability of the P-SCH sequences in neighboring cells becoming the same, or the higher a probability of the P-SCH transmission intervals becoming the same, so that a probability of occurrence of the S-SCH characteristic degradation in the inter-station sync system becomes higher.

Moreover, there is a tradeoff relationship between the time needed for conducting the cell search as described above, or the transmission characteristics of the cell search, and the throughput of the mobile station when the cell search is conducted. Thus, it is desirable to be able to select whether the transmission characteristics of the cell search is to be emphasized or the throughput of the mobile station when the cell search is conducted is to be emphasized.

SUMMARY OF THE INVENTION

Problem(s) to be Solved by the Invention

However, the related art as described above has the following problem.

As described above, the Synchronization Channel (SCH) is a downlink signaling used in the cell search. It has been determined to apply a hierarchical-type SCH for this Synchronization Channel. In this synchronization channel, applying a hierarchical SCH is determined (see 3GPP TS 36.211 V1.0.0 (2007-03), for example.). In other words, the Synchronization Channel includes a Primary Synchronization Channel (SCH) and a Secondary Synchronization Channel (SCH).

Of the Primary SCH and Secondary SCH, cell-specific information sets such as a cell ID group, a radio frame timing, and information on the number of transmit antennas are reported in the Secondary SCH. A user apparatus detects the Secondary SCH sequences to detect the cell-specific information sets.

As described above, in the W-CDMA scheme, in which a surrounding-cell search is conducted for performing a handover, neighboring-cell specific information (neighboring cell information) is reported in advance to the user apparatus prior to the surrounding cell search. In the surrounding cell search for detecting a cell to handover to during communications or at a time of camping, it is possible to decrease the number of candidate cell-specific information sets to be detected when the surrounding cell information, etc., is reported in advance. However, for the LTE system, it has not been decided in detail at this time whether such surrounding cell information is to be reported.

As a method of mapping a secondary sync sequence, a method of mapping different sequences in a frequency direction is being proposed (see 3GPP R1-060042 SCH Structure and Cell Search Method in E-UTRA Downlink, 3GPP R1-071584 Secondary Synchronization Signal Design, for example). For example, as illustrated in FIG. 1, an orthogonal sequence 1 ($P_1(0)$, $P_1(1)$ . . . $P_1(31)$) and an orthogonal sequence 2 ($P_2(0)$, $P_2(1)$, . . . , $P_2(31)$) are mapped in a manner alternating every other sub-carrier. Moreover, as illustrated in FIG. 2, for example, an orthogonal sequence 1 ($P_1(0)$, $P_1(1)$, . . . , $P_1(31)$) and an orthogonal sequence 2 ($P_2(0)$, $P_2(1)$, . . . , $P_2(31)$) are mapped in consecutive sub-carriers. Such dividing of sequences into multiple ones makes it possible to increase the number of patterns which may be transmitted. More specifically, when one type of sequence with a sequence length of 64 is used, for example, 64 types of the number of patterns can be transmitted, while, when two types of sequences with a sequence length of 32 is used as shown in FIG. 2, 1024 types of the number of patterns can be transmitted.

Conventionally, as a sequence for a sync channel, it has been determined to use multiple (for, example, three) types of Zadoff-Chu sequences for the P-SCH and to use a binary sequence, which is a combination of two types of short codes, for the S-SCH (see 3GPP TS 36.211 V1.0.0 (2007-03), 3GPP R1-071794, for example).

It is also known that, when using such an S-SCH sequence as described above, there is a concern for an increased PAPR (peak-to-average power ratio), especially in 1.25 MHz system.

Moreover, in a cell search, it is known to average each cell search stage in the time domain to make it possible to improve a probability of cell detection (For example, see Nagata et al.; "Investigation of Synchronization Channel Sequences in OFDM Based Evolved UTRA Downlink"; RCS; July 2007. July 2007, RCS study group). For example, in a first stage (in other words, a detection of a P-SCH sequence), correlation values are power averaged over multiple radio frames, for example. This makes it possible to reduce receive level variations, thereby improving the probability of the detection. Moreover, in a second stage, or a process of detecting the S-SCH sequence, for example, correlation values of each code of the S-SCH are in-phase averaged over the multiple radio frames. This makes it possible to improve the probability of the detection of the S-SCH. Here, the probability of the detection of the S-SCH includes the probabilities of detection of radio frame timing and of a cell ID group.

As those in the art would appreciate from the teachings of the above references, the term power averaged can be described as the average signal power contained in signal lengths between periods 0 and Ts, where the phase information is discarded. In other words, power averaging of a signal describes how the power of a signal is distributed with frequency over period Ts. Additionally, those in the art would appreciate from the teachings of the above references that the term in-phase averaging can be described as the average signal power contained in signal lengths between periods 0 and Ts, where the phase information is not discarded.

Moreover, the P-SCH and the S-SCH are transmitted in the same 1 ms sub-frame, and a sub-frame which includes the P-SCH and the S-SCH occurs every 5 ms. In other words, the sync channel is transmitted every 5 ms. The user apparatus receives a different P-SCH for each sector to determine a channel estimation value in a sector in which the user apparatus is visiting and, based on the channel estimation value, performs channel compensation of the S-SCH which differs for each cell and demodulate the S-SCH to perform the cell search. In the present application, "a cell" and "a sector" are used interchangeably as long as there is no possibility of confusion, while "the cell" is used to mean that multiple "sectors" are included therein as needed. In an inter-station sync system, in which signals from each of the cells are being synchronized, a mobile station receives signals from multiple cells at the same time. Users around a boundary of sectors belonging to the same base station may determine the sectors since the different P-SCH is received for each of the sectors, but the S-SCH from each sector is common, so that the S-SCH is received as a combined signal from both of the sectors. It is not easy to channel compensate the S-SCH using only a channel estimation value at the visiting sector. Therefore, the detection probability of the S-SCH may end up being degraded. When each of the cells transmits the same S-SCH every 5 ms, such interference may occur every 5 ms, so that the probability of detecting the S-SCH in a mobile station may decrease.

Thus, the problem to be solved by the present invention is to provide a user apparatus and a cell search method that make it possible to improve a probability of a detection of a cell in a cell search.

Means for Solving the Problem

In order to solve the problem as described above, a user apparatus is provided according to the present invention. The user apparatus is a user apparatus to be used in a mobile communications system including multiple cells, including:

a unit which receives a sync channel;

a unit which extracts a primary sync channel and a secondary sync channel from the sync channel and conducts a cell search; and a unit which controls, based on a condition for setting an averaging time in a time direction in the cell search, a correlation detection time in a correlation detection performed in the unit which conducts the cell search.

A cell search method is provided according to the present invention. The cell search method is a cell search method in a user apparatus to be used in a mobile communications system including multiple cells, including the steps of:

receiving a sync channel;

controlling a correlation detection time in a cell search based on a condition for setting an averaging time in a time direction in the cell search; and, according to a control in the controlling step, extracting a primary sync channel and a secondary sync channel from the sync channel and conducting the cell search.

Advantage of the Invention

The disclosed user apparatus and cell search method make it possible to improve a probability of a detection of a cell in a cell search.

BRIEF DESCRIPTION OF THE DRAWINGS

FIG. 8 is an explanatory diagram illustrating an exemplary definition of a sync signal transmission pattern;

FIG. 9A is a diagram for explaining a method of determining the S-SCH sequence;

FIG. 9B is a diagram for explaining another method of determining the S-SCH sequence;

FIG. 15 is a diagram illustrating a variation of a sync signal generator.

DESCRIPTION OF THE PREFERRED EMBODIMENTS

Description of Notations $50_k$ ($50_1$, $50_2$, $50_3$) cell; $100_n$ ($100_1$, $100_2$, $100_3$, $100_4$, $100_5$) mobile station; 102 basic waveform correlator; 104 sync signal replica generator; 106 timing detector; 108 cell number detector of the same base station apparatus: 110 S-SCH correlator; 112 S-SCH detector; 114 controller; $200_m$ ($200_1$, $200_2$, $200_3$) base station apparatus; 202 transmit/receive antenna; 204 amplifier; 206 transmitter/receiver; 208 base band signal processor; 209 sync signal generator; 210 call processor; 212 transmission line interface; $208_1$ RLC processor; $208_2$ MAC controller processor; $208_3$ encoder; $208_4$ data modulator; $208_5$ multiplexer; $208_6$ serial/parallel converter; $208_7$ multiplier; $208_8$ multiplier; $208_9$ scrambled code generator; $208_{10}$ amplitude adjusting unit; $208_{11}$ combiner; $208_{12}$ inverse Fourier transformer; $208_{13}$ CP adder; $209_1$ sync signal controller; $209_2$ sync signal generator; $209_3$ data modulator; $209_4$ serial/parallel converter; $209_5$ multiplier; $209_6$ amplitude adjusting unit; 252 P-SCH generator; 254 S-SCH generator; 256 multiplier; 258 scrambled sequence generator; 260 multiplexer; 300 access gateway apparatus; 400 core network; 1000 radio communications system

BEST MODE OF CARRYING OUT THE INVENTION

With reference to the drawings, a description is given below with regard to embodiments of the present invention. Throughout the drawings for explaining the embodiments, same letters are used for those elements having the same functions, so that repetitive explanations are omitted.

Embodiment 1

System

Figure 1:
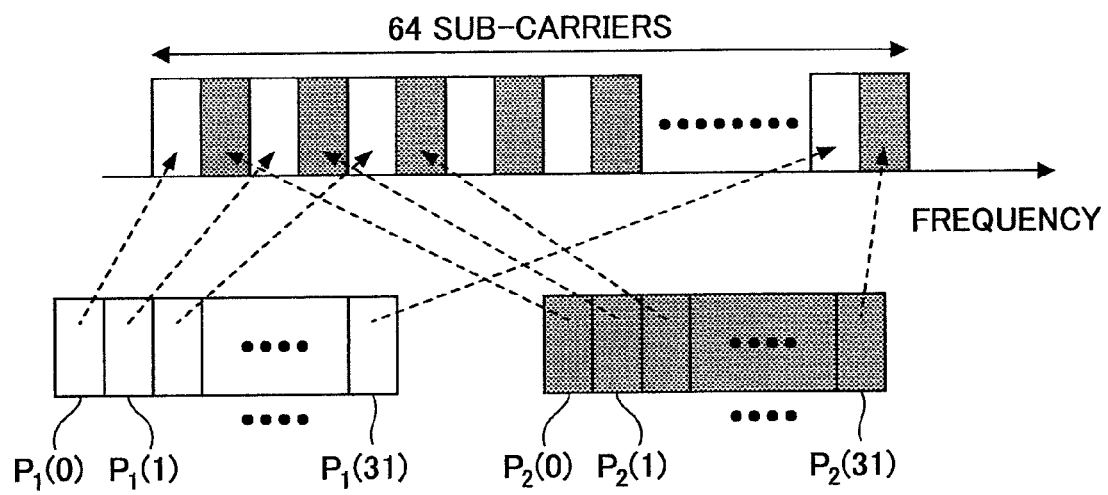
FIG. 1 is a drawing for explaining a method of mapping S-SCH sequences.
Figure 2:
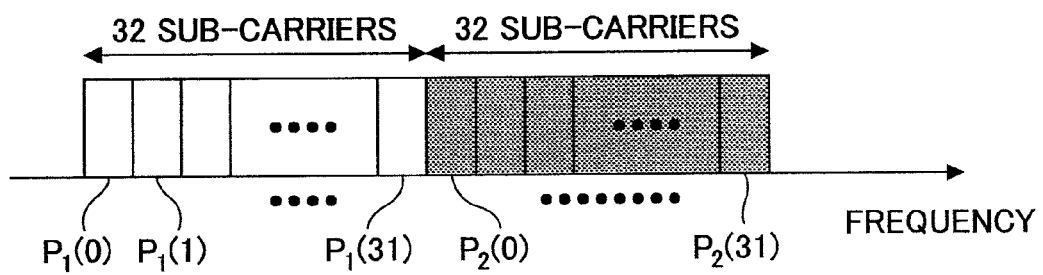
FIG. 2 is a drawing for explaining another method of mapping the S-SCH sequences.
Figure 3:
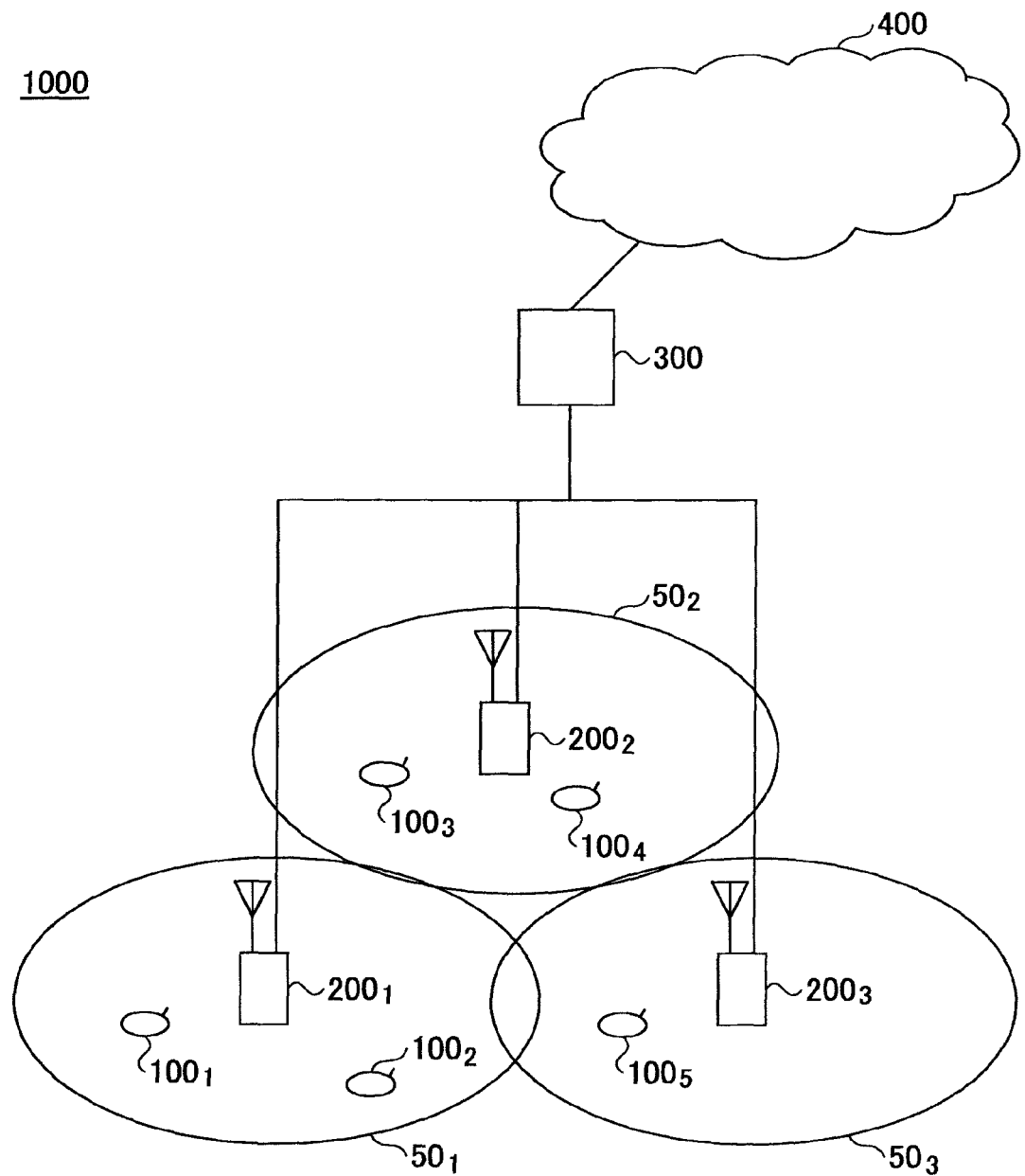
FIG. 3 is a block diagram illustrating a configuration of a radio communications system according to one embodiment.

A radio communications system having mobile station apparatuses and mobile station apparatuses according to an embodiment of the present invention is described with reference to FIG. 3.

The radio communications system 1000 is a system to which Evolved UTRA and UTRAN (also called Long Term Evolution or Super 3G) is applied, for example. The radio communications system 1000 includes a base station apparatus (eNB: eNode B) $200_m$ ($200_1$, $200_2$, $200_3$, ..., $200_m$, where m is an integer greater than 0), and multiple mobile station apparatuses $100_n$ ($100_1$, $100_2$, $100_3$, ..., $100_n$, where n is an integer greater than 0) in communication with the base station apparatus 200. The base station apparatus 200 is connected to an upper-layer station, for example, an access gateway apparatus 300, which is connected to a core network 400. The mobile station $100_n$ communicates with the base station apparatus $200_m$ via the Evolved UTRA and UTRAN in any of cell $50_k$ ($50_1$, $50_2$, $50_3$, ..., $50_k$, where k is an integer greater than 0).

Here, it is assumed that the mobile stations $100_n$ include those having a communications channel established with any of the base station apparatuses $200_m$ and in communications therewith, and those not having a communications channel established with any of the base station apparatuses $200_m$ and not in communications therewith.

The base station apparatus $200_m$ transmits a sync signal. At a time of turning on the power, at a time of camping, or at a time of a DRX reception during communications, the mobile station $100_n$, which is located in any of cells $50_k$ ($50_1$, $50_2$, $50_3$, ... $50_k$, where k is an integer greater than 0), conducts, based on the sync signal, a cell search in which a cell with a radio quality which is good for the own station is detected. In other words, the mobile station $100_n$ detects symbol and frame timings using the sync signal and detects cell-specific control information such as a cell ID (cell-specific scrambled code generated from the cell ID) or a group of cell IDs (below-called cell ID group).

Here, the cell search is performed for both mobile stations $100_n$ which are in communications and those which are not. For example, the cell search for those in communications includes a cell search for detecting a cell of the same frequency and a cell search for detecting a cell of a different frequency. Moreover, the cell search for those not in communications includes a cell search at a time of turning on the power and a cell search at a time of camping, for example.

Below, the base station apparatuses $200_m$ ($200_1$, $200_2$, $200_3$, $200_m$) have the same configuration, function, and status. Thus, unless otherwise indicated, they will be explained below as the base station $200_m$. Below, the mobile station apparatuses $100_n$ ($100_1$, $100_2$, $100_3$, ..., $100_n$) have the same configuration, function, and status. Thus, unless otherwise indicated, they will be explained below as the mobile station $100_n$. Below, the cells $50_k$ ($50_1$, $50_2$, $50_3$, ..., $50_k$) have the same configuration, function, and status. Thus, unless otherwise indicated, they will be described below as the cell $50_k$.

For the radio communications system 1000, OFDMA (Orthogonal Frequency Division Multiple Access) is applied for downlink and SC-FDMA (Single Carrier-Frequency Division Multiple Access) is applied for uplink as radio access schemes. As described above, the OFDMA is a scheme for dividing a frequency band into multiple narrow frequency bands (sub-carriers) and overlaying data onto the respective frequency bands for transmission. The SC-FDMA is a transmission scheme which divides a frequency bandwidth and transmits using different frequency bands among multiple terminals to make it possible to reduce interference between the terminals.

Here, communication channels in the Evolved UTRA and UTRAN are described.

In downlink, a PDSCH (physical downlink shared channel), which is shared for use by each mobile station $100_n$, and a downlink control channel for the LTE are used. In downlink, transport format information and mobile station information mapped to the physical downlink shared channel, transport format information and mobile station information mapped to the physical uplink shared channel, and acknowledgement information on the physical uplink shared channel, etc., are reported using the downlink control channel for the LTE, while user data are transmitted using the physical downlink shared channel.

Moreover, in downlink, the base station apparatus $200_m$ transmits a sync signal for the mobile station $100_n$ to conduct the cell search.

For uplink, a PUSCH (physical uplink shared channel) which is shared for use by each mobile station $100_n$ and an uplink control channel for the LTE are used. There are two types of uplink control channels, a channel which is time multiplexed with the physical uplink shared channel and a channel which is frequency multiplexed with the same.

In uplink, downlink CQI (Channel Quality Indicator) information for use in downlink physical shared channel scheduling, and AMC (Adaptive Modulation and Coding), and downlink physical shared channel HARQ ACK information are transmitted using the uplink control channel for the LTE. Moreover, user data are transmitted using the physical uplink shared channel.

Figure 4:
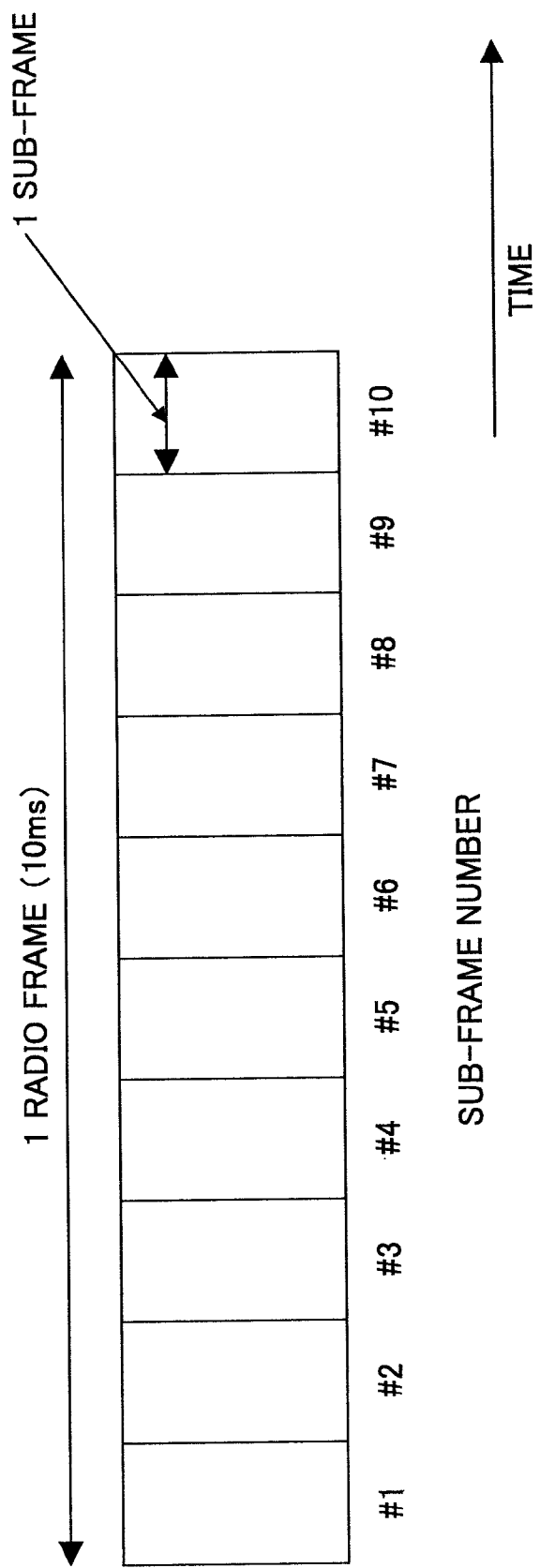
FIG. 4 is a drawing for explaining a radio frame configuration.
Figure 5:
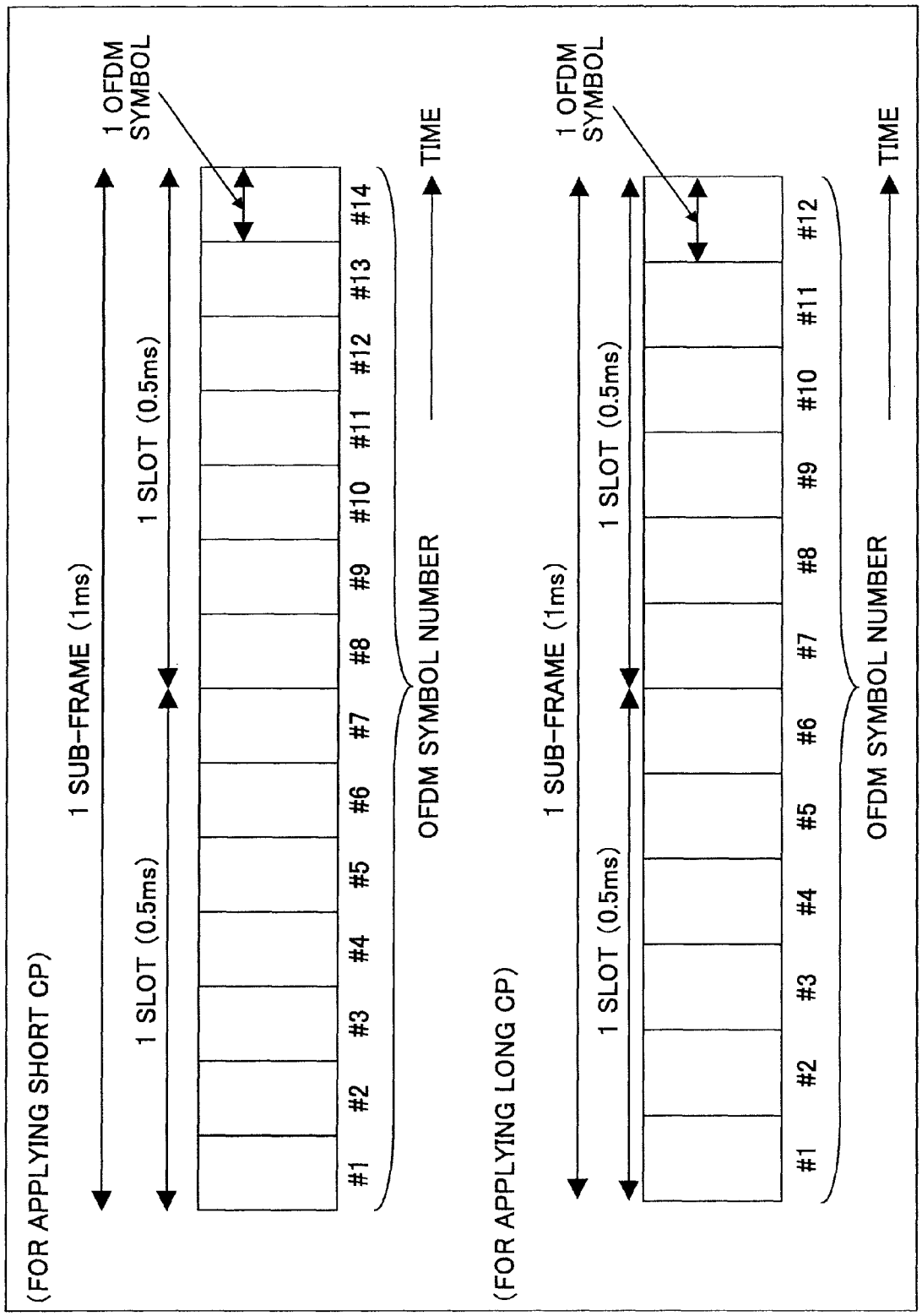
FIG. 5 is a drawing for explaining sub-frame configurations.

As shown in FIG. 4, in downlink transmission, there are 10 sub-frames within one radio frame, which is 10 ms. Moreover, as shown in FIG. 5, one sub-frame includes two slots, one of which slots including 7 OFDM symbols for using a Short CP (upper portion of FIG. 5) and one slot including 6 OFDM symbols for using a Long CP (lower portion of FIG. 5).

Base Station Apparatus eNB

Figure 6:
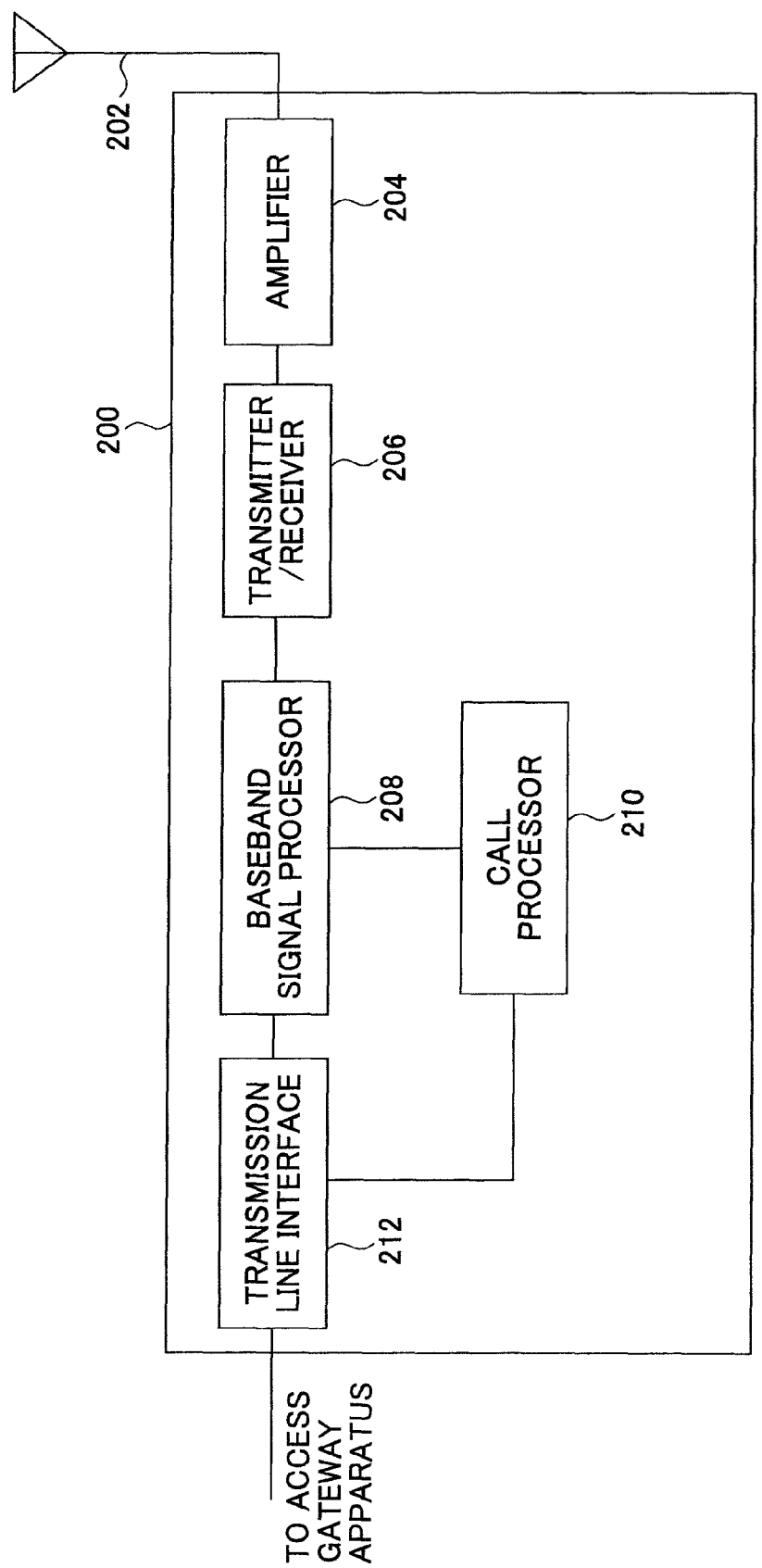
FIG. 6 is a partial block diagram illustrating a base station apparatus according to one embodiment of the present invention.

Next, the base station apparatus $200_m$ according to the embodiment of the present invention is described with reference to FIG. 6.

The base station apparatus $200_m$ according to the present embodiment includes a transmit/receive antenna 202, an amplifier 204, a transmitter/receiver 206, a base band signal processor 208, a call processor 210, and a transmission line interface 212.

Packet data transmitted from the base station apparatus $200_m$ to the mobile station $100_n$ in downlink is input from an upper-layer station which is located at a layer upper to the base station apparatus $200_m$ (for example, access gateway 300) via the transmission line interface 212 to the base band signal processor 208.

The base band signal processor 208 performs an RLC (radio link control) layer transmission process such as an RLC retransmission control transmission process, segmentation/concatenation of packet data, MAC retransmission control, for example, HARQ (Hybrid automatic repeat request) transmission process, scheduling, transmission format selection, channel encoding, inverse fast Fourier transform (IFFT) process before it is transferred to the transceiver 206. Moreover, in the base band signal processor 208, the sync signal is generated as described below. The sync signal is multiplexed to the packet data so as to transfer the multiplexed result to the transceiver 206.

The transceiver 206 frequency converts a base band signal output from the base band signal processor 208 to a radio frequency band, after which the converted base band signal is amplified at the amplifier 204, which amplified base band signal is transmitted from the transmit/receive antenna 202. Here, the base band signal is the above-described packet data or sync signal, etc.

On the other hand, for data transmitted from the mobile station apparatus $100_n$ to the base station apparatus $200_m$ in uplink, a radio frequency signal received at the transmit/receive antenna 202 is amplified at the amplifier 204, which amplified signal is frequency converted at the transceiver 206 to the base band signal, which is input to the base band signal processor 208.

The base band signal processor 208 performs FFT, error correction, MAC retransmission control reception, and RLC layer reception processes on the input base band signal, which processed signal is transferred to an access gateway apparatus 300 via the transmission line interface 212.

The call processor 210 performs status management and resource allocation of the radio base station 200.

Figure 7:
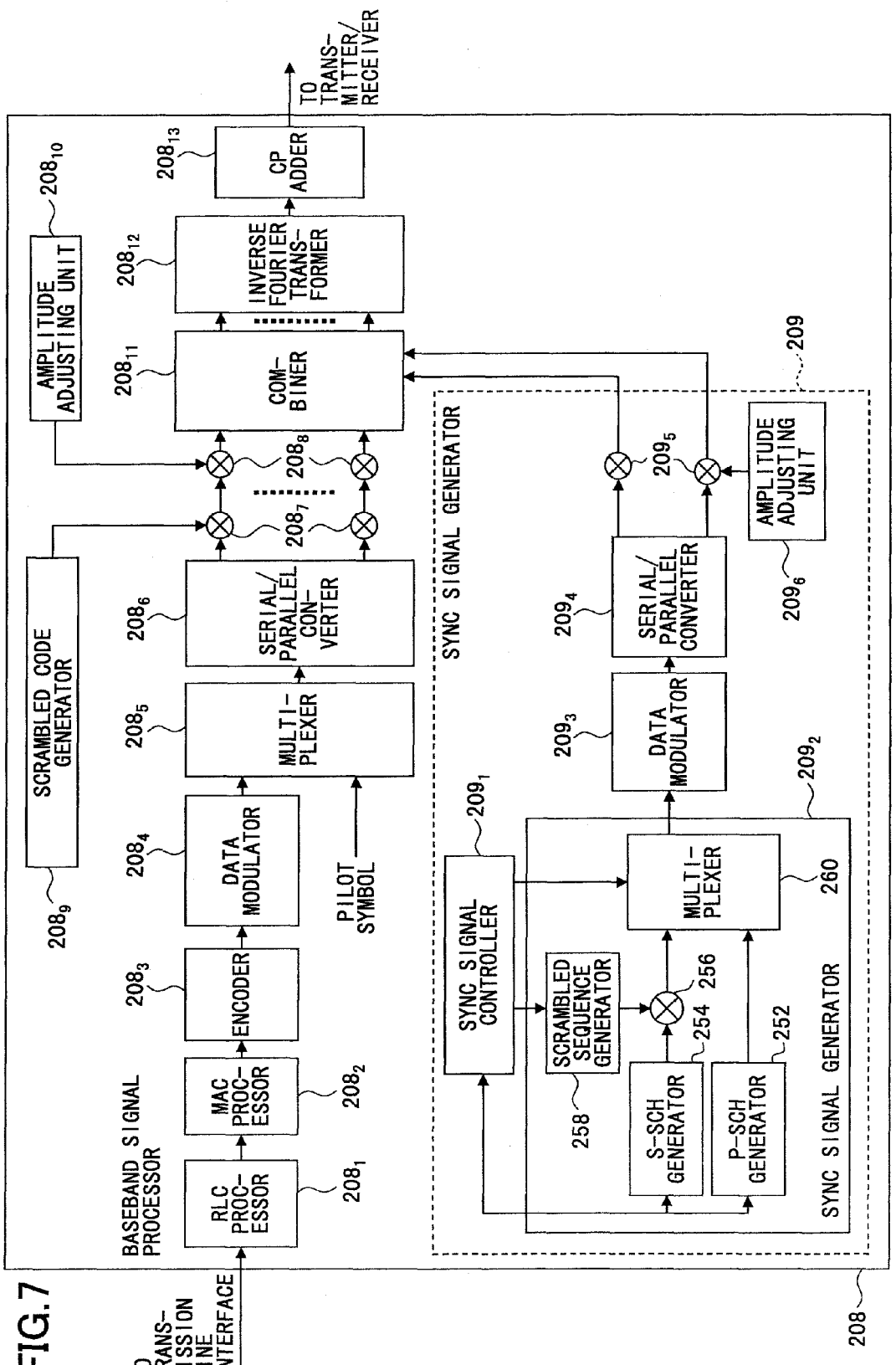
FIG. 7 is a block diagram illustrating a base band signal processor of the base station apparatus according to one embodiment of the present invention.

Next, a base band signal processor 208 is described with reference to FIG. 7. The embodiment according to the present invention relates primarily to downlink, so that, in FIG. 7, those parts related to the downlink process are shown, while those parts related to the uplink process are omitted.

The base band signal processor 208 includes an RLC processor $208_1$, and a MAC (Medium Access Control) processor $208_2$, an encoder $208_3$, a data modulator $208_4$, a multiplexer $208_5$, a serial/parallel converter $208_6$, a multiplier $208_7$, a multiplexer $208_8$, a scrambled code generator $208_9$, an amplitude adjusting unit $208_{10}$, a combiner $208_{11}$, an IFFT (IDFT) $208_{12}$, a CP adder $208_{13}$, and a sync signal generator 209.

The downlink packet data transmission data sequence received from the transmission line interface 212 undergoes an RLC layer transmission process such as an RLC retransmission control transmission process, segmentation/concatenation in the RLC processor $208_1$, and HARQ (Hybrid automatic repeat request) transmission process and the MAC layer transmission process such as scheduling, transmission format selection, and frequency resource allocation in the MAC processor $208_2$ before it is encoded in the encoder $208_3$ and data modulated in the data modulator $208_4$. Then, a pilot symbol is multiplexed to the data modulated transmission data sequence in the multiplexer $208_5$, and the pilot-symbol-multiplexed transmission data sequence is serial/parallel converted in the serial/parallel converter $208_6$ to N information symbol sequences on the frequency axis so that they are lined up on the frequency axis. Here, the pilot symbol is a downlink reference signal (DL-RS), for example. A scrambled code output by the scrambled code generator $208_9$ is multiplied in the frequency direction to N information symbol sequences lined up on the frequency axis as described above in each of N multipliers $208_7$, and then an amplitude-adjusting sequence value output by the amplitude adjusting unit $208_{10}$ is multiplied to the scrambled code-multiplied symbol sequence in each of N multipliers $208_8$, which multiplied results are output to the combiner $208_{11}$. The combiner $208_{11}$ multiplexes, to scrambled code and amplitude adjusting sequence value-multiplied symbol sequence with a code length of N, the sync signal generated at the sync signal generator 209, which multiplexed result is further multiplexed to a relevant particular sub-carrier out of N sub-carriers.

As described below, numbers of a sub-frame and slot in which the sync signal is transmitted is determined by the sync signal controller $209_1$. In the numbers of the sub-frame and the slot in which the sync signal is transmitted, the sync signal generated in the sync signal generator 208 is combined with another signal (a symbol sequence, which is downlink packet data to which a scrambled code and an amplitude adjusting sequence value are multiplied) in the combiner $208_{11}$. For the numbers of the sub-frame and slot in which a sync signal is not transmitted, a sync signal generated in the sync signal generator 209 is not multiplexed. In this case, only a symbol sequence of a sequence length N, that is downlink packet data multiplied by the scrambled code and amplitude adjusting sequence. The sync signal-multiplexed sub-carrier is located at a band which includes the center of the whole frequency bandwidth, for example. Moreover, the sync signal-multiplexed sub-carrier bandwidth is 1.25 MHz, for example.

The inverse Fourier transformer (IFFT) $208_{12}$ transforms N symbols to orthogonal multi-carrier signals. The CP adder $208_{13}$ inserts a CP to this multi-carrier signal per time period for the IFFT. For each cell, which of two types of CP lengths of Long CP and Short CP is used is selected per cell.

The sync signal generating process in the sync signal generator 209 is described. The sync signal includes a first sync signal (below called a primary sync channel or a P-SCH) and a second sync signal (below called a secondary sync channel or an S-SCH). The sync signal generator 209 includes a sync signal controller $209_1$, a sync signal generator $209_2$, a data modulator $209_3$, a serial/parallel converter $209_4$, a multiplier $209_5$, and an amplitude adjusting unit $209_6$. The sync signal generator $209_2$ includes a P-SCH generator 252, an S-SCH generator 254, a multiplier 256, a scrambled sequence generator 258, and a multiplexer 260. The sync signal controller $209_1$ is connected to the P-SCH generator 252, the S-SCH generator 254, the scrambled sequence generator 258, and the multiplexer 260 of the sync signal generator.

Based on a cell ID or a cell ID group of a cell in which communications using the Evolved UTRA and UTRAN are provided by the base station apparatus $200_m$, the sync signal controller $209_1$ determines sequence numbers of P-SCH and S-SCH, and the sub-frame and slot numbers in which the P-SCH and S-SCH are transmitted. The mobile station may specify a cell based on a pilot signal (in other words, a signal pattern of a reference signal) after a cell ID group is specified, for example. In this case, for example, the cell ID and the Reference Signal pattern are specified in advance. Alternatively, the mobile station may specify a cell based on demodulating and decoding of the P-SCH and S-SCH, for example. In this case, the P-SCH sequence number and cell ID information is specified in advance. For the P-SCH, a different sequence is selected per sector. For example, the P-SCH sequence for a three-sector cell is selected from a set which includes three different sequences.

Then, the sync signal controller $209_1$ reports the P-SCH sequence number to the P-SCH generator 252, and the S-SCH sequence number to the S-SCH generator 254. Moreover, the sync signal controller $209_1$ reports the sub-frame number and the slot number to the multiplexer 260 as sync signal timing information.

For example, as illustrated in FIG. 8, the radio communications system 1000 defines the sub-frame and slot numbers transmitted by the P-SCH and the S-SCH. In this example, using multiple types (for example, three types) of P-SCH sequences, a sync signal is transmitted in the sub-frame numbers 1 and 6. Moreover, in this example, the P-SCH being mapped to the last OFDM symbol of a slot makes it possible to demodulate the P-SCH regardless of whether the Long CP or the Short CP is used in the mobile station. The reason is that, in the last OFDM symbol of the slot, the 6th OFDM symbol when the Long CP is applied and the 7th OFDM symbol when the Short CP is applied match in time. In other words, in both the short CP and the long CP, the beginning and end timings of the slot match. Here, the radio communications system may relate the P-SCH sequence number and the cell ID number information in advance. Such association as described above being performed by the radio communications system 1000 makes it possible for the sync signal controller $209_1$ of each base station apparatus $200_m$ to determine the P-SCH sequence number based on the cell ID of a cell in which communications using the Evolved UTRA and UTRAN are provided by the base station apparatus 200.

In general, a communications area provided by the base station apparatus $200_m$ is divided into two or more areas. This is called sectorization. When the base station apparatus $200_m$ has multiple sectors, the cell ID or the cell ID group may be used as an ID of an area combining all sectors of the base station apparatus $200_m$, or as an ID of each sector of the base station apparatus 200. When the cell ID or the cell ID group is used as the ID of the area combining all the sectors of the base station apparatus $200_m$, a combination of the sync signal sequence and numbers of the sub-frame and the slot in which the sync signal is transmitted is set per base station apparatus $200_m$. When the cell ID or the cell ID group is used as the ID of each sector of the base station apparatus $200_m$, the above-described combination of the sync signal sequence and the numbers of the sub-frame and the slot in which the sync signal is transmitted is set per base station apparatus $200_m$.

As the P-SCH sequence, such sequences as a CAZAC (constant amplitude zero autocorrelation sequence) (e.g., a Zadoff-Chu sequence (see C. Chu, "Polyphase codes with good periodic correlation properties" IEEE Trans. Inform. Theory, vol. 11-18, pp. 531-532, July 1972, for example)), a Frank sequence (see R. L. Frank and S. A. Zadoff, "Phase shift pulse codes with good periodic correlation properties", IRE Trans. Inform. Theory, vol. IT-8, pp. 381-382, 1962, for example.), a Modulated Frank sequence (see R. L. Frank and S. A. Zadoff, "Phase shift pulse codes with good periodic correlation properties", IRE Trans. Inform. Theory, vol. IT-8, pp. 381-382, 1962, for example.), a Golay Complementary sequence (M. J. E. Golay, "Complementary Series," IRE Trans. Inform. Theory, vol. 7, pp. 82-87, April 1961, for example.), a Double Repetitive Golay Complementary sequence (see 3GPP, R1-062487 Hierarchical SCH signals suitable for both (FDD and TDD) modes of E-UTRA, for example.), a PN (Pseudo Noise) may be used.

Moreover, as the S-SCH sequence, a two-layer S-SCH sequence in which a scrambled sequence (i.e., a non-orthogonal or orthogonal sequence) is multiplied to an orthogonal sequence or a non-orthogonal sequence (see 3GPP, R1-070146, S-SCH Sequence Design) may be used, or an S-SCH sequence in which multiple orthogonal sequences or multiple non-orthogonal sequences are alternately arranged in the frequency domain may be used, or an S-SCH sequence in which a scrambled sequence (i.e., a non-orthogonal or orthogonal sequence) is multiplied to multiple orthogonal sequences or multiple non-orthogonal sequences may be used, or an S-SCH sequence in which multiple orthogonal sequences or multiple non-orthogonal sequences, which are arranged in consecutive sub-carriers, are multiplied to a scrambled sequence (i.e., a non-orthogonal sequence or an orthogonal sequence) may be used. As an orthogonal sequence, a Walsh-Hadamard sequence, a phase rotated orthogonal sequence, an orthogonal M sequence may be used, and, as a non-orthogonal sequence, a CAZAC sequence such as a GCL sequence, a Golay sequence, a Golay Complementary sequence, an M sequence (see 3GPP, R1-072093, Details on SSC Sequence Design, for example.) and a PN sequence, etc., may be used.

The P-SCH generator 252 and the S-SCH generator 254 respectively generate the P-SCH and S-SCH sequences based on the sync signal sequence information and sync signal transmission timing information that are reported by the sync signal controller $209_1$.

For example, when generating the S-SCH, the sync signal generator $209_2$ may put cell-specific information reported in the S-SCH into a hierarchy. The cell-specific information includes at least one of a cell ID group, a radio frame timing, and information on the number of transmit antennas. Here, the radio communications system 1000 may report some of information sets put into the hierarchy as advance information such as surrounding cell information when the mobile station conducts a cell search. For example, as the advance information, the cell ID groups may be reported, some of the cell ID groups may be reported, the radio frame timing may be reported, information on the number of transmit antennas may be reported, or any one of information sets combining the cell ID groups, some of the cell ID groups, the radio frame timing, and the information on the number of transmit antennas may be included. The above makes it possible to reduce the number of sequences detected when the mobile station conducts the cell search.

More specifically, as shown in FIG. 9A, for example, the cell ID groups are divided into multiple types of sequences (for example, two types of sequences, each of which includes short codes of sequence lengths of 31 sequences). "A first short code" on the vertical axis shows a sequence index of the first short code in the S-SCH sequence, for example, when the two types of short codes with a sequence length of 31 sequences are used. While 31 of each of the sequence indices are provided, the number of sequence indices to be allocated to the first and second short codes are described above may be limited as needed.

As shown, the sequence index of the first short code that is used at a (frame) timing number 1 is selected from a first numerical range (0-13). The sequence index of the second short code that is used at the timing number 1 is selected from a second numerical range (23-30). The sequence index of the first short code that is used at a timing number 2, which is 5 ms after the timing number 1, is selected from the second numerical range (23-30). The sequence index of the second short code that is used at the timing number 2 is selected from the first numerical range (0-13).

In this way, arranging numerical ranges of sequence indices used at first and second timings such that they do not overlap makes it possible to have a small number of code candidates for searching each of the first short codes and the second short codes, speedily conduct the search, and to speedily determine that, when the sequence index of the first short code is detected, it corresponds to the timing number 1.

FIG. 9B is a diagram for explaining another method of determining the S-SCH sequence. In an example shown, the sequence indices of the first and second short codes are selected from the same numerical range (0-30). For convenience of explanations, assume that the sequence indices of the first and second short codes are m and n. In the example shown, a combination of m and n is selected such that $m-n \leq \Delta$ or $n-m \leq \Delta$ is met. The m and n are integers between 0 and 30, while $\Delta$ is an integer no less than 29. As the sequence index is selected from a numerical range which is wider than in the case of FIG. 9A, the degree of freedom of combining codes used in a secondary sync channel increases, which is preferable from a point of view of avoiding a collision.

Figure 10:
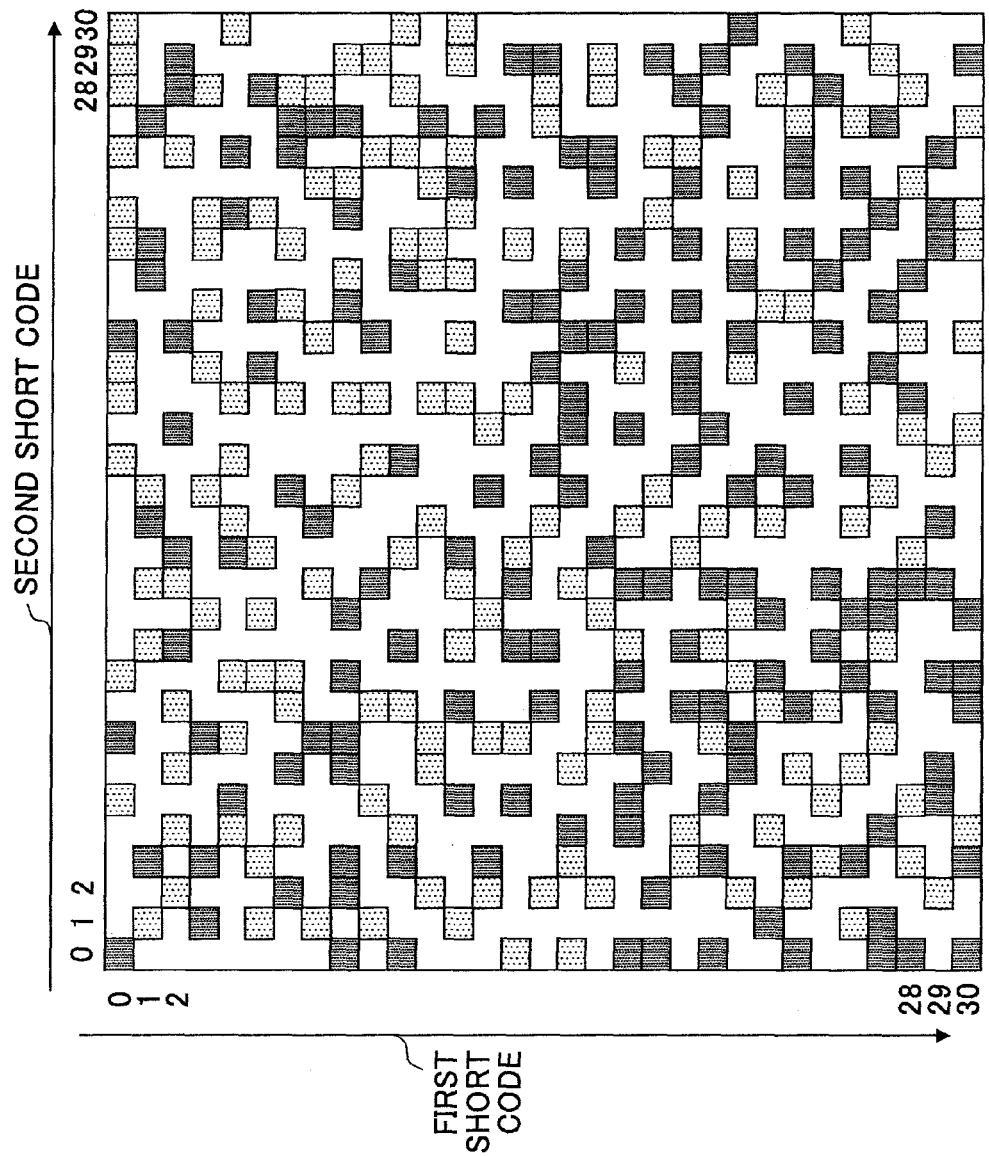
FIG. 10 is a diagram for explaining a further method of determining the S-SCH sequence.

FIG. 10 is a diagram for explaining a further method of determining the S-SCH sequence. In an example shown, the sequence indices of the first and second short codes are also selected from the same numerical range (0-30). While there are no simple rules as in FIG. 9A or FIG. 9B, the first and the second short codes are combined in various ways such that the same combinations do not occur.

The P-SCH sequence generated by the P-SCH generator 252 is input to the multiplexer 260, while the S-SCH sequence generated by the S-SCH generator 254 is input to the multiplexer 256. The sync signal controller $209_1$ inputs, into the scrambled sequence generator 258, information indicating a scrambled sequence. For example, the sync signal controller $209_1$ inputs, to the scrambled sequence generator 258, information indicating a scrambled code common to all cells. Based on the input information indicating the scrambled sequence that is input by the sync signal controller $209_1$, the scrambled sequence generator 258 generates the scrambled sequence and inputs the same into the multiplier 256. In the multiplier 256, the scrambled sequence is multiplied to the S-SCH, and the scrambled sequence-multiplied S-SCH sequence is input to the multiplexer 260. As the scrambled sequence length, scrambling (spreading) may be performed over the two types of short codes, or scrambling may be performed on the respective two types of short codes. Depending on the multiple types of the scrambled sequence, any one of e.g., system information sets for the S-SCH sequence, e.g., the frame timing, cell ID group, information on the number of transmit antennas may be reported. In this way, the S-SCH sequence PAPR may be decreased in a 1.25 MHz system, in particular.

However, the probability of the detection of the S-SCH by the user apparatus decreases due to interference from a neighboring cell when the neighboring cell and/or a cell within the same base station uses the same S-SCH sequence. Thus, it takes time for the cell search, leading to degraded cell search time characteristics. From the point of view that the interference from the neighboring cell is randomized to overcome this problem, the sync signal controller $209_1$ preferably inputs, into the scrambled sequence generator 258, information showing a scrambled sequence which is different per cell from multiple types of scrambled sequences. In this case, as the S-SCH scrambled code, scrambled sequences which differ from one cell to another, or multiple types of scrambled sequences may be used, or the scrambled sequences which differ from one base station to another may be used. In this case, based on the information showing the scrambled sequence that is input by the sync signal controller $209_1$, the scrambled sequence generator 258 generates the scrambled sequence to input the generated sequence into the multiplier 256. Here, for the generated scrambled sequence, a P-SCH sequence-specific scrambled sequence that is collated with a P-SCH sequence number may be generated.

Moreover, for example, a scrambled sequence which is specific to a sequence number of one of the two types of short codes may be generated (see 3GPP, R1-072661, Scrambling Method for Two S-SCH Short Code, for example). In the multiplier 256, the scrambled sequence input by the scrambled sequence generator 258 is multiplied to the S-SCH sequence, and the multiplied result is input into the multiplexer 260. As the scrambled sequence length, scrambling may be performed over the two types of short codes, or scrambling may be performed on the respective two types of short codes. For example, for the scrambled sequence to be multiplied, the scrambled sequence specific to all cells may be used, or P-SCH sequence-specific scrambled sequence may be used, or multiple types of scrambled sequences may be used, or of the two types of short codes, the scrambled sequence specific to the sequence number of one of the short codes may be used. Moreover, for example, of the two types of short codes, one of the short codes may be multiplied to the scrambled sequence common to all cells, and the other of the short codes may be multiplied to the scrambled sequence specific to the P-SCH. Furthermore, for example, of the two types of short codes, one of the short codes may be multiplied to the scrambled sequence specific to the P-SCH sequence, and the other of the short codes may be multiplied to the scrambled sequence specific to the short code sequence number. Depending of the multiple types of scrambled sequences, any one of system information sets for the S-SCH sequence, e.g., the frame timing, the cell ID group, the information on the number of transmit antennas may be reported, for example. The multiplexer 260 multiplexes the P-SCH sequence and the scrambled-sequence multiplied S-SCH sequence so as to input the multiplexed result into the data modulator $209_3$.

The sync signal sequence generated by the sync signal generator $209_2$ is data modulated in the data modulator $209_3$, and further serial/parallel converted in the serial/parallel converter $209_4$ so that the serial/parallel converted result is converted to $N_{SCH}$ symbol sequences on the frequency axis. In the multiplier $209_5$, an amplitude-adjusting sequence value input by the amplitude adjusting unit $209_6$ is multiplied to the $N_{SCH}$ symbol signals, and the multiplied result is output to the combiner $208_{11}$.

User Equipment UE

Figure 11:
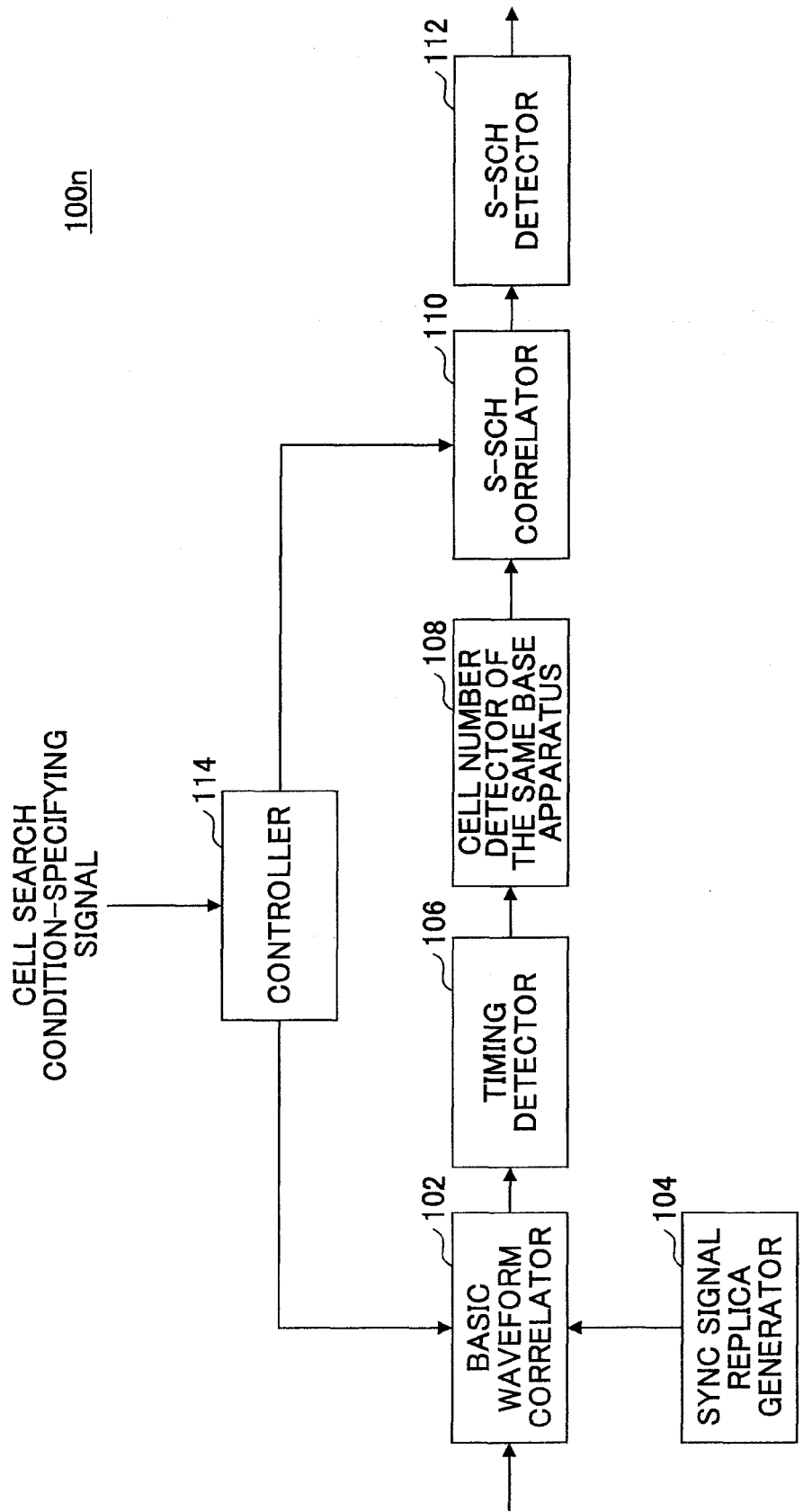
FIG. 11 is a partial block diagram illustrating a mobile station apparatus according to an embodiment.

Next, a mobile station $100_n$ according to the present embodiment is described with reference to FIG. 11.

The mobile station $100_n$ includes a base waveform correlator 102, a sync signal replica generator 104, a timing detector 106, a cell number detector 108 of the same base station apparatus, an S-SCH correlator 110, an S-SCH detector 112, and a controller 114.

A cell-search condition-specifying signal is input to the controller 114. The cell search condition-specifying signal includes cell search information, which includes information of an initial cell search or a surrounding cell search. The initial cell search is a cell search which is conducted first at the time of turning on the power, while the surrounding cell search is a cell search which is performed for detecting a cell to handover to.

The mobile station $100_n$ inputs a multi-carrier signal into the basic wave correlator 102 received at an antenna. On the other hand, the sync signal replica generator 104 generates a sync signal replica of a basic waveform that is set in advance, and successively inputs the generated results into the basic waveform correlator 102. For example, the sync signal replica generator 104 generates a sync signal replica which includes three different sequences, and inputs the same into the basic waveform correlator 102. The basic waveform correlator 102 controls the process of averaging in the time domain by the controller 114 to detect a correlation of a multi-carrier signal received and the sync signal replica which includes three different sequences input by the sync signal replica generator 104.

The controller 114 determines, according to cell search information input, whether the cell search information is information indicating an initial cell search or information indicating a surrounding cell search. From a point of view of improving detection accuracy in the cell search, it is preferable to set the detection time of one with a more severe detection condition longer. For example, a cell with the highest received power needs to be detected in the initial cell search, while a cell other than a cell with the highest received power (e.g., the second highest received power) needs to be detected. Therefore, in a surrounding cell search in an inter-base station sync operation, interference by a visiting cell with a received power which is large relative to a received signal of a cell to handover that is to be detected is large, and the same P-SCHs with timings synchronized collide, so that the surrounding cell search has a more severe detection condition. Thus, in the present embodiment, the controller 114 controls an averaging process time in the time direction such that, when the cell search information input is information indicating the surrounding cell search, it becomes longer than when the cell search information input is information indicating the initial cell search. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

The timing detector 110 detects the P-SCH timing and the P-SCH sequence number from the correlated value and inputs the same into the cell number detector 108 of the same base station apparatus.

The cell number detector 108 of the same base station apparatus detects, based on a P-SCH sequence number input by the timing detector 110, a number (an ID) of a cell an own user apparatus $100_n$ is visiting. Then, the cell number detector 108 of the same base station apparatus inputs, to the S-SCH correlator 110, an S-SCH sequence to which a scrambled sequence is multiplied together with the cell number detected.

The S-SCH correlator 110 uses a control of the process of averaging in the time domain by the controller 114 to determine a correlation between the cell ID group and the S-SCH sequence to which is multiplied a scrambled sequence input by the cell number detector 108 of the same base station. Cells within the same base station belong to the same cell ID group. When a P-SCH-specific scrambled sequence is multiplied to an orthogonal S-SCH sequence, the cell number within the same base station becomes known from detecting the P-SCH sequence. For example, the S-SCH correlator 110 determines a correlation between the cell ID group and the S-SCH sequence to which the scrambled sequence is multiplied in the frequency axis direction. The controller 114 controls the averaging process time in the time direction such that, when the cell search information input is information indicating the surrounding cell search, cell search information input becomes longer relative to when the cell search information input is information indicating the initial cell search. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

The S-SCH detector 112 detects the S-SCH based on a result of correlation detection in the S-SCH correlator 110. For example, the S-SCH detector 112 performs the detection from multiple S-SCH sequences determined by the cell ID and the radio frame timing. In particular, with 170 types of cell ID groups and two types of radio frame timings existing, S-SCH detection is performed from 170×2=340 types of S-SCHs.

Moreover, when a cell number within the same base station that is to be known by the P-SCH sequence detection is not taken into account, the S-SCH detector 112, for example, may detect from multiple S-SCH sequences determined by the P-SCH-specific scrambling, the radio frame timing, and the cell ID group. Particularly, with 170 types of cell ID groups, two types of radio frame timings, and three types of P-SCH specific scrambling, the S-SCH detection is performed from 170×2×3=1020 types of S-SCHs. Moreover, the detection may be performed from multiple S-SCH sequences determined using first short code-specific second short code scrambled sequences. In this case, with multiple S-SCH sequences determined from X (where X is an arbitrary integer from 2 to 31) types of first short code-specific second short code scrambled sequences, the S-SCH detection is performed from 170×2×3×X=1020X types of S-SCHs.

This is described below more specifically.

The cell search is conducted using the P-SCH and the S-SCH that are included in the downlink signal. Based on the P-SCH sequence and the S-SCH sequence that are defined by the radio communications system 1000 as described above, the cell search is conducted. In other words, by detecting the P-SCH sequence and the S-SCH sequence, the cell ID or the cell ID group is detected. Then, after detecting the cell ID, using the scrambling code associated with the cell ID, broadcast information (e.g., primary broadcast channel) is received, completing the cell search process. Details of the P-SCH sequence and the sync signal transmission pattern that are defined by the radio communications system 1000 are omitted for being the same as the explanation in the base station apparatus 200$_m$.

For example, when the radio communications system 1000 defines the sync signal transmission patterns in FIG. 8 and the P-SCH sequence number and the cell ID information are associated in advance, the timing detector 110 detects the sync channel timing and the P-SCH sequence number. Moreover, the S-SCH detector 112 descrambles using the scrambled sequence multiplied to the S-SCH sequence, and detects information elements included in the S-SCH to make it possible to detect cell-specific information.

Sync Channel Transmission/Reception

Next, a method of transmitting sync channels according to the embodiment of the present invention is described.

The S-SCH generator 254 selects multiple sync signal sequences. For example, in the radio frame timings #1 and #2, two types of sequences, a sequence having 16 short codes with the sequence length of 32 (a first layer cell ID group indicator #1) and another sequence having 16 short codes with the sequence length of 32 (a second layer cell ID group indicator #2) are selected. Then, it may be arranged for the S-SCH generator 254 to generate advance information to be reported to the mobile station in advance. For example, advance information indicating the first layer cell ID group, which is a part of information for specifying the cell ID group, may be generated. If the advance information is generated, it is transmitted.

Moreover, the S-SCH generator 254 generates the secondary sync channel using the selected multiple sync signal sequences. For example, a secondary sync channel is generated which indicates a secondary layer cell ID group which is a part of information specifying a cell ID group, together with a first layer cell ID group which is a part of information specifying a cell ID group. The sync signal controller 209$_1$ inputs, to the scrambled sequence generator 258, information indicating a scrambled sequence. For example, the sync signal controller 209$_1$ inputs, to the scrambled sequence generator 258, information indicating the scrambled sequence which is common to all of the cells. Moreover, the sync signal controller 2091, for example, inputs, to the scrambled sequence generator 258, information indicating multiple types of scrambled codes. The secondary sync channel is input to the multiplier 256, where, at the multiplier 256, the scrambled sequence generated by the scrambled generator 258 is multiplied to the input secondary sync channel, so that the multiplied result is transmitted.

The mobile station detects the cell-specific information using the advance information and the secondary sync channel.

Figure 12:
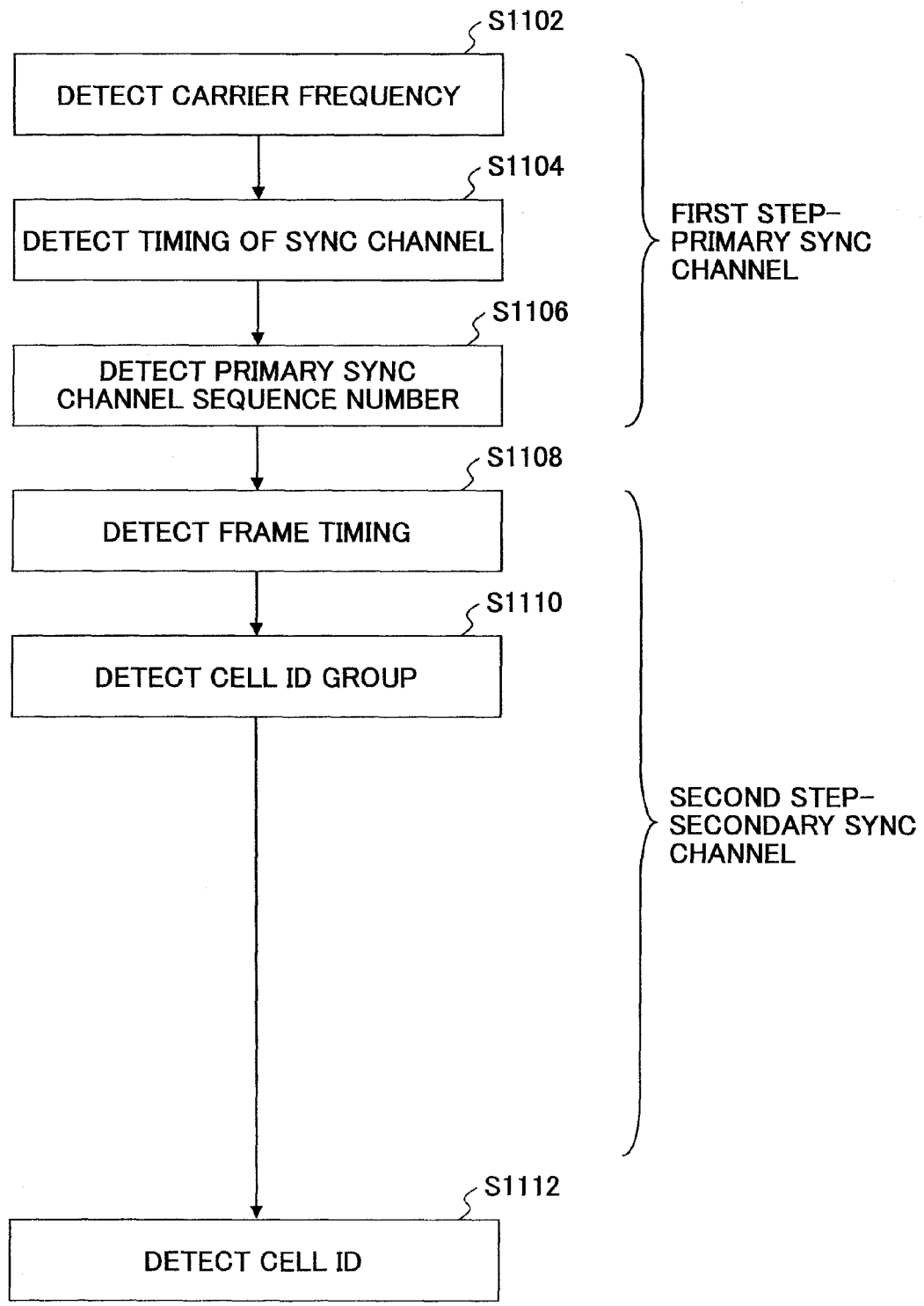
FIG. 12 is a flow diagram illustrating a cell search method according to an embodiment.

Next, a cell search method in the radio communications system 1000 according to the embodiment of the present invention is described with reference to FIG. 12.

As a first step, the mobile station detects the correlation between a primary sync channel sequence and a received signal, and detects a carrier frequency and a timing of the primary sync channel (S1102, S1104). For example, the correlation is detected between a received multi-carrier signal, and a sync signal replica that includes three different sequences. As a result, the primary sync channel sequence number is detected (step S1106). Here, when conducting a surrounding cell search, the user controller 100$_n$ controls the averaging process time in the time direction in the correlation detection process to be longer relative to when conducting an initial cell search. For example, the correlation detection time may be set longer with, as a unit, P-SCH included in one radio frame, or may be set longer with one radio frame as a unit. In this first step, the mobile station may determine the signal phase difference and compensates for the frequency offset.

Once the primary sync channel symbol timing, the carrier frequency, and the primary sync channel sequence number are known, the secondary sync channel receive timing and carrier frequency also become known. The scrambled sequence-multiplied secondary sync channel is descrambled.

Next, radio frame timing is detected from a secondary sync channel sequence specific to a cell used in the secondary sync channel (S1108). Typically, multiple (for example, 2) sync channels are arranged for each frame, so that it is necessary to detect the frame timing after detecting the timing. Moreover, the cell ID group is detected from the cell-specific secondary sync channel sequence (S1110). Here, when the surrounding cell search is performed, the user apparatus 100$_n$ controls the averaging process time in the time direction in the correlation process performed in detecting the frame timing to be longer relative to when the initial cell search is performed. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

Here, reporting to the mobile station in advance part or all of the cell ID groups as advance information, for example, makes it possible to reduce the number of candidate specific information sets to be detected, thus allowing increased detection accuracy. As a result, the characteristics may be improved. As the advance information, the radio frame timing may be reported or the information on the number of antennas may be reported.

When the base station has multiple transmit antennas, it may report the information on the number of transmit antennas in the secondary sync channel, and, in the second step, the mobile station may detect the number of transmit antennas (MIMO (Multiple Input Multiple Outputs) information on the number of antennas) (S1112). In particular, it may detect the information on the number of transmit antennas used for the base station to transmit the broadcast channel.

Next, the cell ID is detected using the cell ID group detected in the second step and the primary sync channel sequence number detected in the first step (S1112).

According to the present embodiment, an averaging time in time domain of the cell search based on the cell search information makes it possible to improve the time characteristics of the cell search.

Embodiment 2

The user apparatus $10_n$ according to another embodiment of the present invention is described.

The user apparatus according to the present embodiment differs from the above-described embodiment in that base station operation information is input as a cell search condition-specifying signal. The base station operation information includes information indicating one of inter-base station sync and inter-base station non-sync.

The controller 114 determines, according to the base station operation information input, whether the base station operation information is information indicating an inter-base station sync or an inter-base station not-sync. From a point of view of improving the detection accuracy in the cell search, it is preferable to set the detection time of one with a more severe detection condition longer. For example, a cell with the highest received power needs to be detected in the initial cell search, while a cell other than a cell with the highest received power (e.g., the second highest received power) needs to be detected in the surrounding cell search. Therefore, in a surrounding cell search in the inter-base station sync operation in particular, interference from a visiting cell with a received power which is large relative to a received signal of a cell to handover to that is to be detected and the same P-SCHs with the timings synchronized collide, so that the detection condition of the inter-base station sync operation is more severe. Thus, in the present embodiment, when the base station operation information input is information indicating inter-base station sync, the controller 114 controls the averaging process time in the time direction to become longer relative to when the base station operation information input is information indicating inter-base station non-sync. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

In the present embodiment, controlling the averaging time in the time domain in a cell search based on base-station operation information makes it possible to improve the time characteristics of the cell search.

Embodiment 3

The user apparatus $100_n$ according to a further embodiment of the present invention is described.

The user apparatus according to the present embodiment differs from the above-described embodiments in that cell-search stage information is input as a cell-search condition-specifying signal. The cell search stage information includes information indicating one of a first stage cell search and a second stage cell search. Here, the first stage cell search indicates a process of detecting a correlation between a multi-carrier signal received at the basic waveform correlator 102 and a sync signal replica which includes three different sequences input by the sync signal replica generator 104. Moreover, the second stage cell search represents a process of determining a correlation between a cell ID group and an S-SCH sequence to which a scrambled sequence is multiplied, which is input by a cell number detector 108 of the same base station that is performed at the S-SCH correlate 110.

The controller 114 determines, according to the cell search stage information input, whether the cell search stage information is one of information indicating a first stage cell search and a second stage cell search. Then, depending on whether the cell search stage information input is information indicating a first stage cell search or information indicating a second stage cell search, the averaging process time in the time direction is controlled. When the cell search stage information input is information indicating a first stage cell search, the averaging process time may be set to be larger than when it is information indicating a second stage cell search, or, when the cell search stage information input is information indicating a second stage cell search, the averaging process time in the time direction may be set longer than when it is information indicating a first stage. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

In the present embodiment, while a case is described of performing a process of detecting a correlation between a received multi-carrier signal and a replica of a sync signal that includes three different sequences input by the sync signal replica generator 104, it may be arranged to perform a process of limiting the 3 types of P-SCH sequence signals to 1 or 2 types and detecting a correlation between a received multi-cast signal and a sequence corresponding to the limited P-SCH sequence number.

According to the present embodiment, controlling an averaging time in the time domain in a cell search based on cell search stage information makes it possible to improve a cell search time characteristic.

Embodiment 4

The user apparatus $100_n$ according to a further embodiment of the present invention is described.

The user apparatus according to the present embodiment is different from the above-described embodiments in that information on the number of cell search attempts is input as a cell-search condition-specifying signal.

According to the information on the input number of times of cell search attempts, the controller 114 controls the averaging process time in the time direction according to the number of times of the cell search attempts. For example, the averaging process time in the time direction may be arranged to be longer with an increase in the number of the cell search attempts. This makes it possible to improve the probability of successfully conducting, even when a first cell search failed, the next cell search. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

According to the present invention, an averaging time in the time domain in a cell search can be controlled based on information on the number of times of cell search attempts to improve the time characteristic of the cell search.

Embodiment 5

The user apparatus $100_n$ according to a further embodiment of the present invention is described.

The user apparatus according to the present embodiment differs from the above-described embodiment in that received SINR information is input as a cell search condition-specifying signal.

The controller 114 controls the averaging process time in the time direction according to the received SINR information input. For example, based on the received SINR information, it is determined whether the own user apparatus $100_n$ is located at a cell edge or near the base station apparatus $200_m$. Based on the determining, when it is determined that the own user apparatus $100_n$ is located at the cell edge, the controller 114 controls the averaging process time in the time direction to be long relative to when it is determined to be near the base station apparatus 200. For example, based on the received SINR information input, when the received SINR is less than a predetermined threshold, the averaging process time in the time direction is controlled relative to when the received SINR is no less than a predetermined threshold determined in advance. This threshold is determined based on whether the user apparatus $100_n$ is located at the cell edge or near the base station apparatus 200. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

According to the present embodiment, the averaging time in the time domain in the cell search may be controlled based on the received SINR information to improve the cell search time characteristics.

Embodiment 6

The user apparatus $100_n$ according to a further embodiment of the present invention is described.

The user apparatus according to the present embodiment is different from the above-described embodiments in that a maximum Doppler frequency is input as a cell search condition-specifying signal.

The controller 114 controls the averaging process time in the time direction according to maximum Doppler frequency information input. For example, a moving speed of an own user apparatus $100_n$ is estimated based on the maximum Doppler frequency information. Then, based on the estimated moving speed of the own user apparatus $100_n$, when the moving speed of the own user apparatus $100_n$ is no less than a predetermined threshold set in advance, the controller 114 controls the averaging process time in the time direction to be longer relative to when it is determined that the moving speed of the own user apparatus $100_n$ is no more than a predetermined threshold. More specifically, based on the maximum Doppler frequency information input, when the maximum Doppler frequency is no less than a predetermined threshold, the averaging process time in the time direction is set to be longer relative to when the maximum Doppler frequency is leas than a predetermined threshold set in advance. This threshold is determined based on whether the user apparatus $100_n$ moves at high speed. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

According to the present embodiment, the averaging time in the time domain in the cell search may be controlled based on the maximum Doppler frequency to improve the time characteristic of the cell search.

Embodiment 7

The user apparatus $100_n$ according to a further embodiment of the present invention is described.

The user apparatus according to the present embodiment is different from the above-described embodiment in that delay spread information is input as a cell-search condition-specifying signal.

The controller 114 controls the averaging process time in the time direction according to the delay spread information input. For example, based on the delay spread information, when the delay spread is no less than a predetermined threshold, the averaging process time in the time direction is controlled to be longer than when the delay spread is no more than a predetermined threshold set in advance. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

According to the present embodiment, an averaging time in the time domain in the cell search is controlled based on the delay spread to improve the time characteristic of the cell search.

Embodiment 8

The user apparatus $100_n$ according to a further embodiment of the present invention is described.

The user apparatus according to the present embodiment is different from the above described embodiment in that surrounding cell list information is input as a cell search condition-specifying signal.

The controller 114 controls the averaging process time in the time direction according to the presence of the input neighboring cell list information. For example, when the neighboring cell list information is input, the averaging process time in the time direction is controlled to be longer relative to when the neighboring cell list information is not input. For example, the correlation detection time may be set to be longer with, as a unit, one radio frame (10 ms) including multiple (for example, 10) sub-frames, or it may be set to be longer with, as a unit, five sub-frames in which one P-SCH is included, or a half (5 ms) of the one radio frame.

According to the present embodiment, the averaging time in the time domain in the cell search may be controlled to improve the time characteristic of the cell search according to the presence of neighboring cell list information.

Embodiment 9

Next, a radio communications system having base station apparatuses and mobile station apparatuses according to other embodiments of the present invention is described. The radio communications system, base station apparatuses, and mobile station according to the present embodiments are configured in a manner similar to what are described with reference to FIGS. 3, 6, 7, and 11.

In the base station apparatus 200 according to the present embodiments, the sync signal controller $209_1$ inputs, to the scrambled sequence generator 258, information showing the P-SCH sequence-specific scrambled sequence based on the P-SCH sequence number. In this case, based on the information showing the scrambled sequence that is input by the sync signal controller $209_1$, the scrambled sequence generator 258 generates the scrambled sequence and input the generated sequence into the multiplier 256. In the multiplier 256, the P-SCH sequence-specific scrambled sequence is multiplied to the S-SCH sequence, and the multiplied result is input into the multiplexer 260. In this case, the P-SCH sequence number and the scrambled sequence number are specified such that they are explicitly collated in advance. This is different from the first to the eighth embodiment in which the P-SCH sequence number and the scrambled sequence number are not explicitly collated in advance as such. In the P-SCH, a sequence which is different from one sector to another is selected, so that a different scrambled sequence is multiplied to the S-SCH. For example, the three-sector cell P-SCH sequence is selected from a set which includes three different sequences, so that the scrambled sequence to be multiplied to the S-SCH sequence is also selected from a set which includes three different scrambled sequences.

The timing detector 106 of the mobile station $100_n$ detects the P-SCH timing and the P-SCH sequence number from the correlation value determined in the basic waveform correlator 102. When the P-SCH sequence number is detected, the P-SCH sequence specific scrambled sequence-multiplied S-SCH sequence is descrambled. Then, based on the detected P-SCH timing, the S-SCH is detected at the S-SCH detector 112 with the P-SCH as a reference signal.

Moreover, in the cell search method, in the flow described with reference to FIG. 12, the primary sync channel sequence number is detected in step S1106. Using the detected primary sync channel sequence number, a primary sync channel-specific scrambled sequence multiplied to the secondary sync channel also becomes known. The primary sync channel-specific scrambled sequence-multiplied secondary sync channel is descrambled. Then, the process proceeds to step S1108.

In this way, when the neighboring cell and/or the cell in the same base station is using the same S-SCH sequence, randomizing interference from the neighboring cell is made possible, allowing an improved probability in detecting the S-SCH. As a result, the time needed for the cell search may be reduced, allowing an improved cell search time characteristics.

Moreover, in detecting the S-SCH, when performing channel estimation based on the P-SCH sequence, the channel estimation may be performed with a channel condition for each cell being taken into account, making it possible to improve the channel estimation accuracy. The ability to improve the channel estimation accuracy makes it possible to improve the detection accuracy of the S-SCH.

Moreover, in the present embodiment, the P-SCH-specific scrambled sequence is applied (multiplied) to the S-SCH sequence. Unlike the first to the eight embodiments, there is a predetermined corresponding relationship between the P-SCH sequence and the scrambled sequence, which corresponding relationship is known at the mobile station. When the mobile station detects the SCH symbol timing in an initial stage (a first stage) of the cell search, it also detects the P-SCH sequence number at the same time. The P-SCH sequence number corresponds one to one with the scrambled sequence number multiplied to the S-SCH. Thus, compared to the first to the eighth embodiments, the S-SCH scrambled sequence number may be more speedily specified based on the detected P-SCH sequence number. Therefore, there is no need to detect multiple types (for example, three types) of S-SCH scrambled sequence numbers. Therefore, in detecting the S-SCH sequence, it is made possible to generate three types of S-SCH scrambled sequences without increasing the amount of computation.

Figure 13:
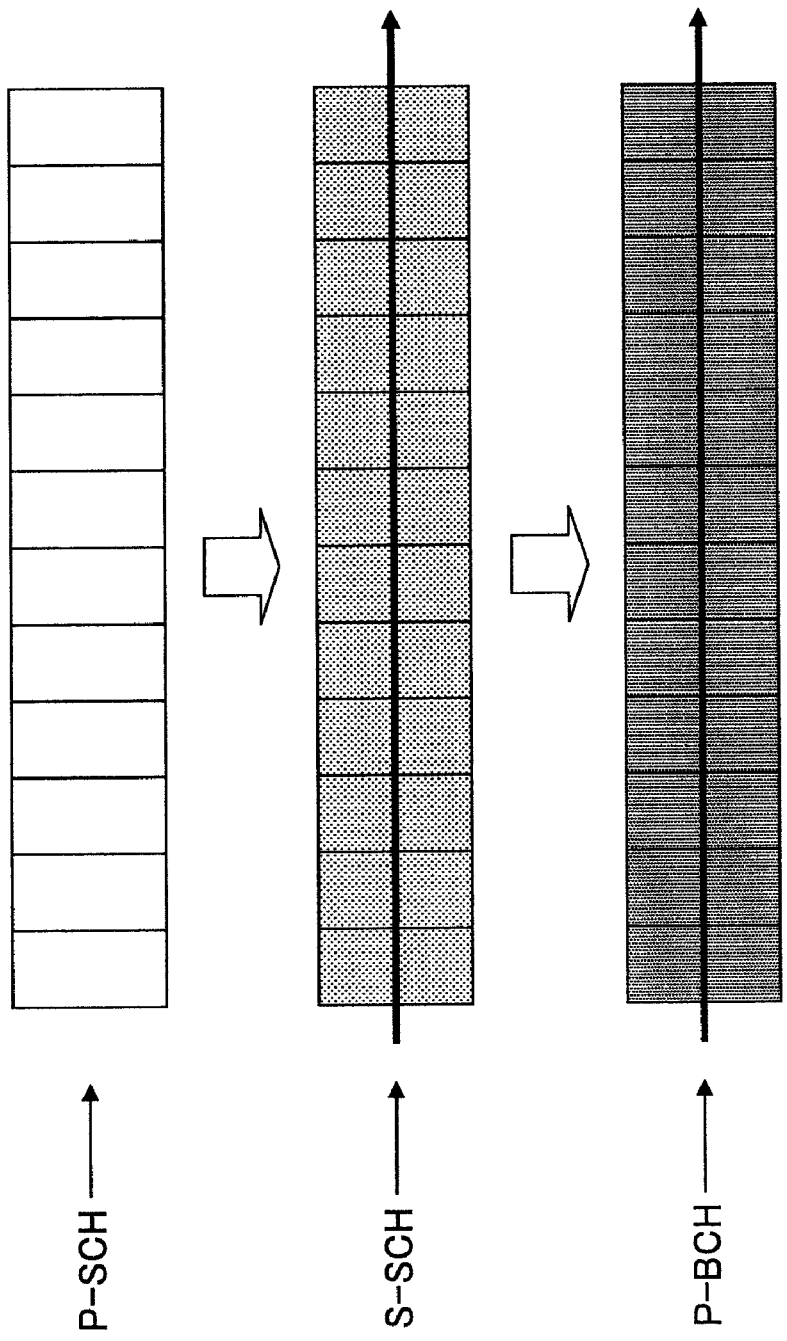
FIG. 13 is a drawing for explaining a method of generating a scrambled code in a primary broadcast channel.

Moreover, in detecting the primary broadcast channel (P-BCH), it is made possible to generate 510 types of scrambled sequences without increasing the amount of computation. As described above, in detecting the S-SCH sequence, it is made possible to use three types of scrambled sequences without increasing the amount of computation. The above will be explained with reference to FIG. 13. The P-SCH, which includes three types of scrambled sequences, does not undergo the scrambling process. The S-SCH undergoes the scrambling process using a P-SCH-specific scrambled sequence (for example, three types of scrambled codes). The P-BCH undergoes the scrambling process using a cell-specific scrambled sequence (for example, 510 types of scrambled codes). The S-SCH sequence reports 170 types of cell ID group information using an orthogonal sequence (for example, two types of short codes). Therefore, in demodulating the P-BCH, it is made possible to generate (three types of scrambled sequences)×(170 types of cell ID group information)=510 types of scrambled codes without increasing the amount of computation.

Moreover, in demodulating the P-BCH, it is made possible to conduct channel estimation taking into account the channel condition per channel, allowing an improved channel estimation accuracy. The ability to improve the channel estimation accuracy allows the P-BCH demodulation accuracy to be improved.

Embodiment 10

Figure 14:
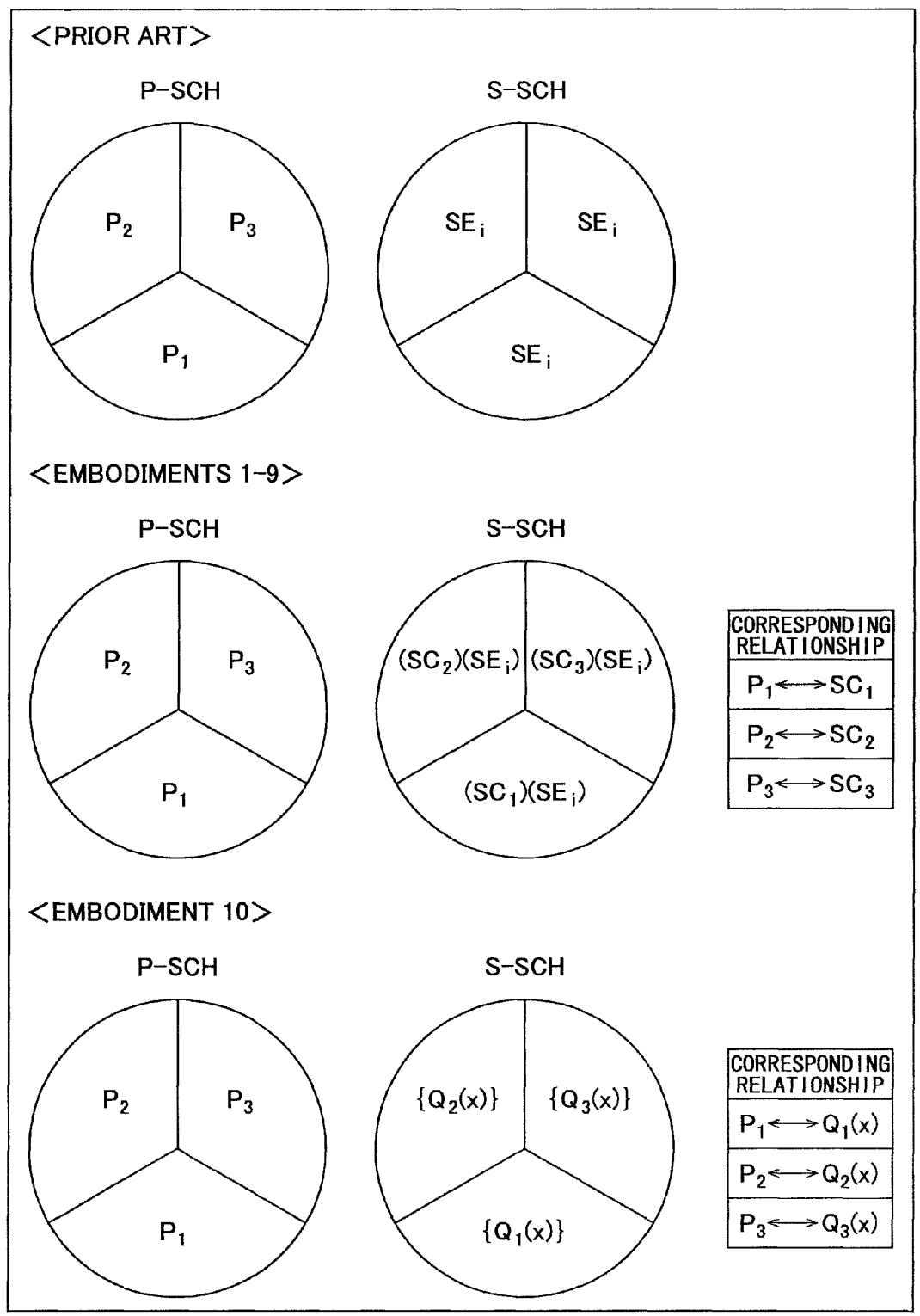
FIG. 14 is a diagram illustrating a method of transmitting SCHs.

FIG. 14 is a drawing for explaining the difference among a conventional example, the first to the ninth embodiments, and a below-described tenth embodiment. In the conventional example, primary sync channels $P_1$, $P_2$, and $P_3$ are respectively transmitted as P-SCH using the sectors 1, 2, and 3. For example, when the number of sectors per base station is three as shown, the P-SCH differs from one sector to another, making it possible for a user apparatus to determine a visiting sector and obtain a channel estimation value at the visiting sector. This is similar in the embodiments. In the conventional example, information ($SE_i$: i is a parameter which distinguishes a cell) indicating a secondary sync channel which differs from one cell to another is provided, and sectors belonging to the same base station transmit the same secondary sync channel $SE_i$. As described above, the detection probability of the S-SCH could decrease near the sector boundary as a result of the same signals being transmitted in neighboring sectors.

In the first to the ninth embodiments, a scrambled code $SC_j$ which differs from sector to sector is multiplied to information $SE_i$ indicating a secondary sync channel. Even when the $SE_i$ is the same for all sectors, if the scrambled code $SC_j$ differs from one sector to another, $SC_1 \times SE_i$, $SC_2 \times SE_i$, $SC_3 \times SE_i$ all become different codes. This makes it possible to transmit an S-SCH which differs from sector to sector and to accurately demodulate the S-SCH even near the sector border. In the second embodiment, a primary sync channel $P_i$ which differs from one sector to another and a scrambled code $SC_j$ which differs from sector to sector are collated in advance, the corresponding relationship thereof being known at the user apparatus. This makes it possible to speedily demodulate the S-SCH after confirming the primary sync channel P-SCH.

In the first to the ninth embodiments, a scrambled code is used, so that some code ($SE_i$) to which a scrambled code is multiplied must be present. However, in the present invention, such two types of codes ($SC_j$ and $SE_i$) are not required to be present. In the tenth embodiment of the present invention, different generating polynomials $Q_i(X) Q_2(X), Q_3(X)$ which differ for each primary sync channel $P_1$, $P_2$, and $P_3$ which differs from one sector to another are collated. The generating polynomial $Q_i(X)$ is a polynomial for generating a code such as $X^5+X^2+1$, for example. The sequence generated with the generating polynomial may be any appropriate sequence, but, preferably is a linear feedback shift register (LSFR) sequence, and more preferably an M sequence. For example, suppose that the generating polynomial $Q_1(X)$ corresponding to the primary sync channel $P_1$ of the first sector is a polynomial which generates M sequences of a code length 31. In this case, in the first sector, multiple ones of any one code sequence out of 31 code sequences that can be generated with the generating polynomial $Q_i(X)$ are combined for use in the S-SCH. Similarly, in the second sector, multiple ones of any code sequence out of 31 code sequences that can be generated with the generating polynomial $Q_2(X)$ are combined for use in the S-SCH, while in the third sector, multiple ones of any code sequence out of 31 code sequences that can be generated with the generating polynomial $Q_3(X)$ are combined for use in the S-SCH. The user apparatus specifies a primary sync channel P-SCH to confirm a visiting sector and specifies a generating polynomial (for example, $Q_1(X)$) used in the visiting sector based on a corresponding relationship as shown at the bottom right of FIG. 14. Then, the user apparatus confirms which of 31 codes drivable from the generating polynomial $Q_1(X)$ are actually used as S-SCH out of 31 codes which are derivable from the generating polynomial $Q_1(X)$. As P-SCH ($P_i$) and the generating polynomial ($Q_i(x)$) only correspond on a one on one basis, so that, as long as the user apparatus can confirm the visiting sector, a code derived from a generating polynomial used in another sector does not have to be taken into account. Only a code derivable from a generating polynomial corresponding to one of the P-SCHs needs to be taken into account. For brevity of explanation, it is illustrated such that only one generating polynomial corresponds to one sector, but it may be arranged for one combination of multiple generating polynomials to correspond to the one sector. In this case, a different sector corresponds to a different combination of multiple generating polynomials.

FIG. 15 illustrates a part of a base station apparatus used in the tenth embodiment. The illustrated part relates to a sync signal controller $209_1$ and a sync signal generator $209_2$. FIG. 15 is generally similar to what is shown in FIG. 7, however the present embodiment does not utilize a scrambled code, so that the scrambled sequence generator 258 and the multiplier 256 are not shown. However, a scrambled code can be used in this embodiment as well. For example, when the same scrambled code is used in all sectors, a scrambled code is multiplied at the S-SCH generator 254. Moreover, at the S-SCH generator 254, it may be arranged for a scrambled code collated to a sequence number of a first short code out of 2 types of short codes in the S-SCH sequence to be multiplied to a second short code. (See 3GPP, R1-072661, Scrambling Method for Two S-SCH Short Code, for example.). The corresponding relationship between the initial sync channel P-SCH and the generating polynomial $Q_i(X)$ are managed at the sync signal controller $209_1$. According to an instruction from a sync signal controller $209_1$, the S-SCH generator 254 generates a secondary sync channel and inputs the same into the multiplexer 250. In the present embodiment, the S-SCH generator 254 generates a code based on a generating polynomial $Q_i(X)$ specified by the sync signal controller $209_i$ and inputs, into the multiplexer 260, a code to be actually used as the S-SCH. Thereafter, the sync channel, including the S-SCH as described above, is transmitted to the data modulator $209_3$ and undergoes the above described process, after which it is wirelessly transmitted.

While, for the above-described first to eighth embodiments, a case of using, as a search condition-specifying signal, any one of the cell search information, base station operation information, cell search stage information, information on the number of times of cell search attempts, received SINR information, a maximum Doppler frequency, delay spread information, and surrounding cell list information, it may be arranged to use not only one set but multiple sets of information and to control, based on the multiple information sets, the averaging process time in the time direction in the cell search. For example, for a case such that the cell search information is information indicating a surrounding cell search and the base station operation information is information indicating an inter-base station sync, the averaging process time in the time direction is controlled to be longer relative to the other case, more specifically, a case such that the cell search information is information indicating an initial cell search and the base station operation information is inter-base station non-sync.

Moreover, in the above described first to eight embodiments, cases have been explained of setting the correlation detection time longer with, as a unit, one radio frame (10 ms) including multiple (e.g., 10) sub-frames and of setting the correlation detection time longer with, as a unit, five sub-frames in which one P-SCH is included, or a half (5 ms) of the one radio frame, it may be arranged to limit the same to a shorter range or to extend to a longer range.

In the above-described embodiments, exemplary systems to which the Evolved UTRA and UTRAN (also called the Long Term Evolution or Super 3G) is applied have been described. However, the mobile apparatus, base station apparatus, and the method of transmitting the sync channel are applicable in all systems using the Orthogonal Frequency Division Multiplexing (ODFM) in downlink.

For convenience of explanations, specific numerical value examples are used to facilitate understanding of the present invention. However, unless otherwise specified, such numerical values are merely exemplary, so that any appropriate value may be used.

As described above, while the present invention is described with reference to specific embodiments, the respective embodiments are merely examples, so that a skilled person will understand variations, modifications, alternatives, replacements, etc. For convenience of explanations, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present application claims priority based on Japanese Patent Application No. 2007-258105 filed on Oct. 1, 2007 with the Japanese Patent Office, the entire contents of which are hereby incorporated herein by reference.

The invention claimed is:

1. A user apparatus to be used in a mobile communications system including multiple cells; comprising:
 a unit which receives a sync channel;
 a unit which extracts a primary sync channel and a secondary sync channel from the sync channel and conducts a cell search,
  wherein correlation values are power averaged over multiple radio frames when extracting the primary sync channel, and
  wherein correlation values are in-phase averaged over the multiple radio frames when extracting the secondary sync channel; and
 a unit which controls, based on a condition for setting an averaging time in a time direction in the cell search, a correlation detection time in a correlation detection performed in the unit which conducts the cell search.

2. The user apparatus as claimed in claim 1, wherein the condition includes at least one of: cell search information; base station operation information; cell search stage information; information on a number of times of cell search attempts; received SINR information; a maximum Doppler frequency; delay spread information; and surrounding cell list information.

3. The user apparatus as claimed in claim 2, wherein the unit which controls the correlation detection time controls the correlation detection time with, as a unit, a radio frame which includes multiple sub-frames.

4. The user apparatus as claimed in claim 2, wherein, when the primary sync channel is extracted, the unit which conducts the cell search generates a replica of a sync signal that includes not more than three types of different sequences, and detects a correlation between the replica of the sync.

5. The user apparatus as claimed in claim 2, wherein, when the secondary sync channel is extracted, the unit which conducts the cell search detects a correlation between a received multi-carrier signal, and multiple secondary sync channel sequences that are determined by a radio frame timing and a group of cell IDs.

6. The user apparatus as claimed in claim 1, wherein the unit which controls the correlation detection time controls the correlation detection time with, as a unit, a radio frame which includes multiple sub-frames.

7. The user apparatus as claimed in claim 6, wherein, when the primary sync channel is extracted, the unit which conducts the cell search generates a replica of a sync signal that includes not more than three types of different sequences, and detects a correlation between the replica of the sync.

8. The user apparatus as claimed in claim 6, wherein, when the secondary sync channel is extracted, the unit which conducts the cell search detects a correlation between a received multi-carrier signal, and multiple secondary sync channel sequences that are determined by a radio frame timing and a group of cell IDs.

9. The user apparatus as claimed in claim 1, wherein, when the primary sync channel is extracted, the unit which conducts the cell search generates a replica of a sync signal that includes not more than three types of different sequences, and detects a correlation between the replica of the sync.

10. The user apparatus as claimed claim 9, wherein, when the secondary sync channel is extracted, the unit which conducts the cell search detects a correlation between a received multi-carrier signal, and multiple secondary sync channel sequences that are determined by a radio frame timing and a group of cell IDs.

11. The user apparatus as claimed in claim 1, wherein, when the secondary sync channel is extracted, the unit which conducts the cell search detects a correlation between a received multi-carrier signal, and multiple secondary sync channel sequences that are determined by a radio frame timing and a group of cell IDs.

12. A cell search method in a user apparatus to be used in a mobile communications system including multiple cells, comprising the steps of:
 receiving a sync channel;
 controlling a correlation detection time in a cell search based on a condition for setting an averaging time in a time direction in the cell search; and
 extracting a primary sync channel and a secondary sync channel from the sync channel and conducting the cell search according to a control in the controlling step,
 wherein correlation values are power averaged over multiple radio frames when extracting the primary sync channel, and
 wherein correlation values are in-phase averaged over the multiple radio frames when extracting the secondary sync channel.

* * * * *